US012807908B2

(12) United States Patent
Sweeney et al.

(10) Patent No.: US 12,807,908 B2
(45) Date of Patent: Nov. 24, 2026

(54) METHODS AND DEVICES FOR THE CAPTURE AND RETENTION OF GRAIN AROMA IN A SPIRIT DISTILLATE OR A REJOINED SPIRIT DISTILLATE

(71) Applicants: Matt Sweeney, Folsom, CA (US); Douglas J Boyle, III, San Francisco, CA (US); Jason Somerby, Healdsburg, CA (US)

(72) Inventors: Matt Sweeney, Folsom, CA (US); Douglas J Boyle, III, San Francisco, CA (US); Jason Somerby, Healdsburg, CA (US)

(73) Assignee: Matthew Sweeney, Folsom, CA (US)

(*) Notice: Subject to any disclaimer, the term of this patent is extended or adjusted under 35 U.S.C. 154(b) by 946 days.

(21) Appl. No.: 16/774,919

(22) Filed: Jan. 28, 2020

(65) Prior Publication Data

US 2021/0230522 A1 Jul. 29, 2021

(51) Int. Cl.
*C12G 3/022* (2019.01)
*C12G 1/02* (2006.01)
*C12H 1/22* (2006.01)

(52) U.S. Cl.
CPC .................................... *C12G 3/022* (2019.02)

(58) Field of Classification Search
CPC ...................................................... C12G 3/022
USPC .......................................................... 426/592
See application file for complete search history.

(56) References Cited

U.S. PATENT DOCUMENTS 10,301,583 B2 * 5/2019 Schuh ........................ A23L 2/56
2018/0066217 A1 * 3/2018 McCann .................. C12H 6/02

FOREIGN PATENT DOCUMENTS

GB 2316951 * 11/1998 ............... C12G 3/00

OTHER PUBLICATIONS

The Compeat Distiller, Copyright Oct. 2001 by Michael Nixon & Michael McCaw.*
Bathgate, et al., A review of malting and malt processing for whisky distillation, vol. 122, Issue 2, 2016, p. 197-211.*
Fujimkai, et al., Studies on Flavor Components of Roasted barely Part II. The Major Volatile Carbonyl Compounds, Agr. Biol. Chem., vol. 32, No. 4, p. 50-506, 1968 (Fujimaki).*
(Continued)

*Primary Examiner* — Nikki H. Dees
*Assistant Examiner* — Philip A Dubois

(57) ABSTRACT

Disclosed are devices and methods that allow for the capture and retention of grain aroma that would otherwise be lost or reduced in distilled spirits production processes. Devices and methods are disclosed that allow for the capture and retention of aromas released during grain heating. Devices and methods are disclosed that allow for the capture and retention of grain aromas prior to the loss of these aromas in subsequent mashing, fermentation, and distillation processes. In one embodiment, captured and retained aromas from a particular grain are added back to the spirit distillate produced from that same grain. In one embodiment, the grain from which aroma is extracted is subsequently mashed, fermented, distilled and rejoined with the aromatized spirit to produce a rejoined spirit. Devices and methods are disclosed which utilize the grain aroma extraction process as a source of heat for the cooking of grain in subsequent or parallel mashes.

2 Claims, 20 Drawing Sheets

(56) References Cited

OTHER PUBLICATIONS

Fujimkai, et al., Studies on Flavor Components of Roasted barely Part II. The Major Volatile Carbonyl Compounds, Agr. Biol. Chem., vol. 32, No. 4, p. 50-506, 1968 (Fujimaki II).*

Zheng et al, Volatile Compounds of Raw Spirits from Different Distilling Stages of Luzhou-flavor spirit, 2014 vol. 20 Issue 2 pp. 283-293 (Zheng).*

Hodel, Influence of distillation parameters on the extraction of *Juniperus communis* L. in vapour infused gin, J. Inst. Brew. 2020; 126: 184-193.*

* cited by examiner

METHODS AND DEVICES FOR THE CAPTURE AND RETENTION OF GRAIN AROMA IN A SPIRIT DISTILLATE OR A REJOINED SPIRIT DISTILLATE

CROSS-REFERENCE TO RELATED APPLICATIONS

The present application claims the benefit of U.S. Provisional Application Ser. No. 62/798,174 filed Jan. 29, 2019 entitled "Methods and Devices for the Capture and Retention of Grain Aroma in a Spirit Distillate."

FIELD OF THE INVENTION

The inventions described herein are methods and devices used in the production of beverage alcohol, or other beverage or food products. In particular, the methods and devices of the present invention have applications in the production of distilled spirits produced from a mash and fermentation of grain.

BACKGROUND OF THE INVENTION

The consumption of alcoholic beverages by various societies predates written history, and was a major driver of the development of critical elements of civilization, such as the widespread cultivation of crops including cereal grains and grapes. The fermentation of fruit is a relatively simple process requiring little more than the extraction of juice from the fruit; the sugars in fresh juices of most fruits ferment spontaneously-even without the addition of yeast, as the skins of many fruits are covered in wild yeasts. However, the production of alcohol from grains, including cereal grains such as barley, rice, rye, or corn, is a far more complicated process. The sugars in grain are found not as water soluble sugars, but rather as various polymers of sugars, with the most important of these carbohydrates being starch. Prior to the fermentation of starch or other long-chain carbohydrates, these carbohydrates must be depolymerized into soluble sugars (in most cases, this means conversion to monosaccharides and disaccharides such as glucose and maltose).

In order to break down the starch in grain into fermentable sugars, a number of methods have been developed. While it is possible to depolymerize starch thermochemically, such as by hot acid hydrolysis, most methods for depolymerization of starch are enzymatic, with amylases being the class of enzyme that catalyzes the hydrolysis of starch. Both historic and modern methods of converting starch to fermentable sugar use amylases, with these enzymes coming from a range of organisms. In the most primitive of the known methods, grain is chewed by people who then spit the chewed grain into a fermentation vessel. As human saliva contains a small amount of amylase, some of the starch in the grain is converted into fermentable sugars which can then be fermented by yeast into alcohol. While, surprisingly, this method has not totally fallen out of use, other methods for enzymatic starch conversion to fermentable sugar are far more prominent. Over a period of more than 5000 years, two distinct types of traditional processes for efficient enzymatic starch conversions were developed, with these methods differing primarily in the sources of amylase enzymes.

One traditional method for converting starch utilizes enzymes from sprouted grain, using enzymes sourced from grain itself. While this method is often thought of as the "western" process, it very likely was independently developed by several civilizations of various geographies. In this process, grain is moistened to induce germination of the plant embryo, which expresses amylases and other enzymes to utilize the energy reserves found in the starch for growth of the nascent plant. Often, the sprouted grain is subsequently dried (malted) in such a way as to preserve enzyme activity. The enzymes in sprouted or malted grain can then be used to convert carbohydrates to sugar, typically in a process involving grinding, hydrating, and heating the grains to release the enzymes and increase the solubility of starches, in a process called mashing. Often, additional grain (unmalted/unsprouted) is added to the mash of malted/sprouted grain, with this added grain typically being cooked and/or ground to gel/solubilize the starch, and then with the amylases from the mash convert the starch from these cooked grains to fermentable sugars. The temperature of the mash is typically optimized for promotion of both amylase enzyme activity and starch solubility, roughly in the 55-70° C. range depending on a variety of factors. The mash is then cooled, and yeast (typically *Saccharomyces cerevisiae*) is added to initiate fermentation of the sugars.

The second major traditional process for starch utilizes enzymes from fungi (or other microbes), rather than those from germinated grain. The most important of these microbes are the various *Aspergillus* species (including *Aspergillus oryzae, Aspergillus kawachii, Aspergillus awamori*, and others), which were domesticated by southeast Asian cultures more than 1000 years ago, and have applications in not only alcohol production but also in the production of foods such as soy sauce and miso. In alcohol production, such as the production of sake or shochu, grain (or other starch source, such as potatoes) is first cooked to gel the starches. The cooked starches are then inoculated with a co-culture of the fungus *A. oryzae* (or other *Aspergillus* species) and the yeast *S. cerevisiae*. Amylases secreted by the fungus digest the starch to fermentable sugars, while concurrently the yeast convert these newly formed sugars into alcohol.

In addition to the traditional co-culture of *A. oryzae* and yeast, in which starch is simultaneously converted and fermented, other modern processes utilize amylases from fungi and other microbes in other ways. Amylases are commercially produced by the large-scale culture of microbes such as various *Aspergillus* species, followed by purification of the amylases from the microbial biomass. These purified amylases, which are often sold as products to second parties, can be subsequently used to convert a variety of starch sources. In modern industrial processes, starch containing feedstocks, such as grains, often first crushed, rolled, or reduced to flour by a hammer mill or similar device, are then cooked at a high temperature to gelatinize the starches. Purified amylases are then added to the processed grain 'mash,' and the amylases cleave the carbohydrates to fermentable sugars prior to the addition of yeast, with the yeast addition initiating fermentation of these sugars.

In nearly all cases, the grains or other carbohydrate-containing materials are heated in some way during or prior to the mash, which assists in gelling the starch and disrupting the structure of the grain or other material being mashed. One side effect of this cooking of the grain is that volatile compounds and/aerosols are released from the grain or other mash. Many of these compounds are major components to aromas and flavors of the grain, and are partially or fully lost to the environment upon heating.

Regardless of how carbohydrates are converted to sugars, in all cases these sugars are fermented to alcohol, most commonly by the yeast *S. cerevisiae*. Fermentation allows the yeast to produce a small amount of energy from these sugars under anaerobic conditions, converting some of the carbons tied up in the sugar to carbon dioxide. Fermentation of one molecule of the hexose sugar glucose, for example, results in the production of two molecules of ethanol and two molecules of $CO_2$ gas. This $CO_2$ gas forms bubbles in the liquid (or semi-liquid) portions of the fermentation. Eventually the bubbles grow large enough to become buoyant and rise to the surface, resulting in an active fermentation often having the appearance of boiling. Much like with boiling, the churn of $CO_2$ gas escaping the fermentation brings with it a variety of other volatile compounds, which are then lost to the environment. While some compounds lost during fermentation may be unpleasant, such as various metabolites of yeast or other microbes, other lost compounds are desirable, such as those characteristic of the grain or other carbohydrate source.

Some alcoholic beverages, such as beer, sake, or wine, are consumed after fermentation with little or no additional processing (e.g., filtration). In other cases, the fermented material is distilled, a process in which portions of the fermentation are vaporized and then condensed in order to remove impurities and/or increase % alcohol by volume. In addition to removing any impurities which are non-volatile (salts or metal ions, large/bitter molecules), distillation is often conducted with 'cuts,' or fractions that are kept or discarded based on the quality/impurities present in the fractions. Many low-boiling point impurities, often fermentation byproduct metabolites such as ethyl-acetate, acetone, or methanol, are discarded as the "fores" and "heads" fractions. High-boiling point fractions, which contain impurities such as isopropanol or fusel oils, are discarded as "tails" fractions. The most pure ethanol "hearts" fractions are retained, and typically diluted with water prior to consumption. Notably, while removing or discarding of fores, heads, and tails often greatly improves the smoothness of the beverage, and can remove a range of undesirable flavors produced from fermentation, it is often at the cost of discarding substantial flavor and aroma based on other volatile compounds that have boiling points outside of the hearts cut. Thus, the distillation of a spirit is a process that demands the decision to balance between removing a certain portion of the undesirable components and retaining a portion of the desirable aromas. For example, methods are known in the art to produce highly purified alcohol having very low levels of undesirable flavors and aromas from a fermentation, often referred to as neutral spirit, but the processes to produce these neutral spirits concurrently remove most of the desirable flavor and aroma components as well.

There exists an unmet need to provide a method and device that allows for the capture and recovery of the volatile aromas from grain (or other botanicals) lost in the cooking, mashing, fermentation, and/or distillation processes involved in the production of distilled spirits.

There further exists an unmet need to provide a method and device that allows for the grain use in the production of distilled spirits to be cooked/mashed efficiently using recovered heat, waste heat, or inexpensively available heat, reducing the total energy required by the production of distilled spirits and thusly reducing both cost and environmental impact.

SUMMARY OF THE INVENTION

During the production of distilled spirits beverages, various volatile compounds from grain, including aromas perceptible by humans, are lost in the mashing, fermentation, and distillation processes. In many distilled spirits products, the loss of these aromas is undesirable, resulting in a spirit beverage with less, or lesser, aroma and flavor and/or changes in palate perception (e.g., mouthfeel) of the beverage.

Disclosed herein are devices and methods that allow for the capture and retention of grain aroma compounds that would otherwise be lost or reduced in the major processes involved in distilled spirits production.

It is the primary object of the present invention to provide a method and device that allows the capture and recovery of volatile compounds released from grain, or that would have been otherwise lost or reduced from grain, during the cooking, mashing, fermentation, or distillation processes involved in distilled spirits production.

It is an additional object of the present invention to provide a method and device that allows for the grain to be cooked using "recovered" or "waste" heat that would be otherwise lost in the distillation process, allowing for more economical and environmentally friendly spirits production.

Concepts were developed to allow for a vapor condensation device to be affixed to a grain cooking or mashing vessel, with the vapor condensation device so configured as to condense and capture volatile compounds or aromatics as they are released from heated grain. In a preferred embodiment, this heated grain is subsequently converted to fermentable material, fermented, and distilled into an alcoholic spirit. Concepts were further developed to recombine the condensed volatile compounds or aromatics with a distilled alcoholic spirit. In a preferred embodiment, the captured volatile compounds or aromatics are rejoined with the alcoholic spirit produced from the fermentation and distillation to an alcoholic spirit of said grains. In another embodiment, the captured volatile compounds or aromatics are combined with another alcoholic spirit.

Concepts were further developed to allow for grain to be placed within the heating vessel of a distillation device and mixed with an alcoholic spirit, concurrent with the distillation of the alcoholic spirit, with this device being configured such that volatile compounds or aromatics that are released from the grain during the heating and distillation process are captured and retained with the condensed distillate of the alcoholic spirit so as to produce an aromatized alcoholic spirit. Concepts were further developed to allow for the grain that was heated and cooked in this distillation device to be recovered and subsequently mashed, fermented, and distilled to an alcoholic spirit. In a preferred embodiment, the alcoholic spirit produced from the mashing, fermentation, and distillation of the grain is combined with the aromatized alcoholic spirit. In another embodiment, the alcoholic spirit produced from the mashing, fermentation, and distillation of the grain is subsequently aromatized by a new batch of grain. In some embodiments, the aromatized alcoholic spirit is redistilled.

Concepts were further developed to allow for a grain to be placed in an extraction chamber affixed to a distillation device and so configured such that alcoholic vapors produced in the distillation device pass through and interact with the grain in the extraction chamber, such that volatile compounds and aromas are extracted from the grain into the vapor, with these vapors and the extracted grain aromas then being condensed into an aromatized alcoholic spirit. Concepts were further developed to allow for the grain that was vapor extracted in this extraction chamber to be recovered and subsequently mashed, fermented, and distilled to an alcoholic spirit. In a preferred embodiment, the alcoholic spirit produced from the mashing, fermentation, and distillation of the grain is combined with the aromatized alcoholic spirit. In one embodiment, a single batch of grain is split into two portions, with one portion being mashed, fermented and distilled into an alcoholic spirit, with this alcoholic spirit then being redistilled and aromatized through the extraction of the aroma from the second portion of grain resulting in an aromatized distillate, with this second portion of grain then being mashed, fermented and distilled into an alcoholic spirit, and with this alcoholic spirit being rejoined with the aromatized distillate to produce a rejoined spirit. In some embodiments, the aromatized alcoholic spirit or rejoined spirit is redistilled.

Concepts were further developed to allow for grain to be placed in an extraction chamber that is connected to a distillation device by an induced reflux column such that the temperature and composition of the alcoholic vapor passing from the distillation device through the induced reflux column and to the extraction chamber is controlled by means of increasing input heat and/or reflux cooling flow, and so configured such that compositionally-or-temperature-controlled alcoholic vapors pass through and interact with the grain in the extraction chamber, such that volatile compounds and aromas are extracted from the grain into the vapor, with these vapors and the extracted grain aromas then being condensed into an aromatized alcoholic spirit. In some embodiments, the composition and temperature of the vapor are optimized for the increased or decreased extraction of select aromas from the grain. In some embodiments, the composition and temperature of the vapor are optimized to minimize the cooking of the grain. In some embodiments, the composition and temperature of the vapor are optimized to increase the cooking of the grain.

Concepts were further developed to allow for grain to be placed in an extraction chamber affixed to a continuous distillation device and so configured such that alcoholic vapors produced in the continuous distillation device pass through and interact with the grain in the extraction chamber, such that volatile compounds and aromas are extracted from the grain into the vapor, with these vapors and the extracted grain aromas then being condensed into an aromatized alcoholic spirit. Concepts were further developed to allow for the grain that was vapor extracted in this continuous distillation device to be recovered and subsequently mashed, fermented, and distilled to an alcoholic spirit. In a preferred embodiment, the alcoholic spirit produced from the mashing, fermentation, and distillation of the grain is combined with the aromatized alcoholic spirit.

Additional objects, features and advantages of the invention will become more readily apparent from the following detailed description of preferred embodiments thereof when taken in conjunction with the drawings.

DETAILED DESCRIPTION OF THE INVENTION

Figure 1A:
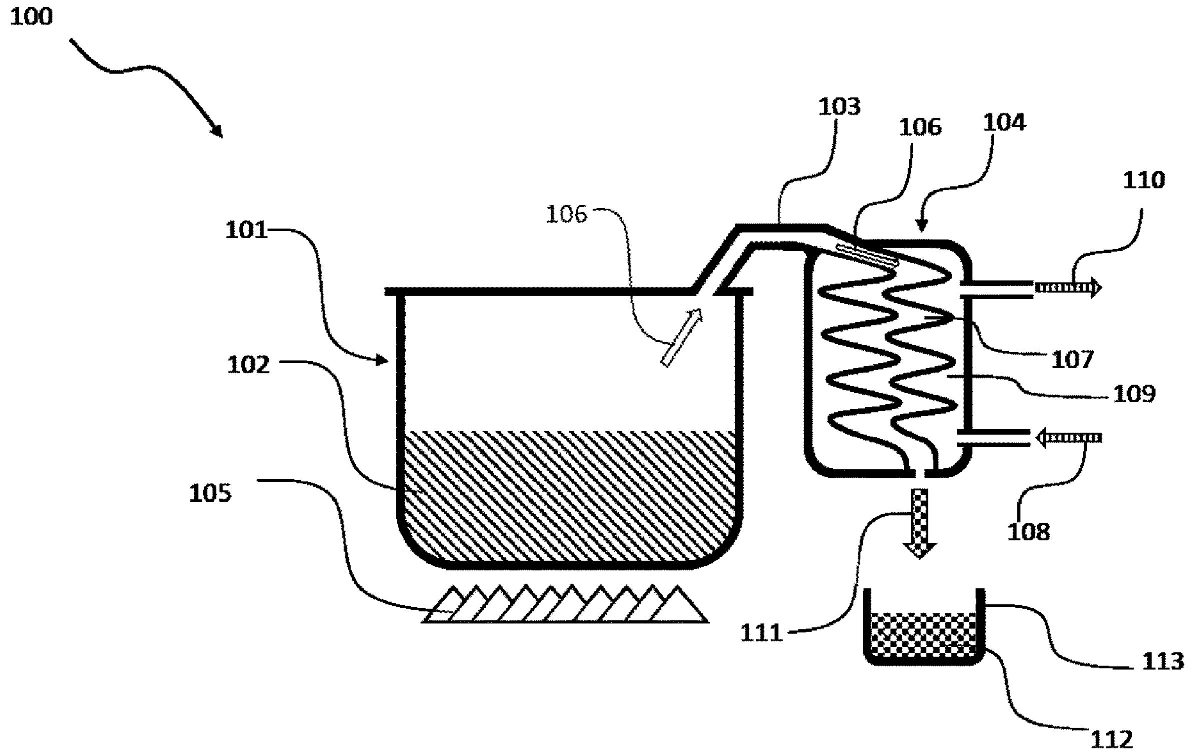
FIG. 1A is a drawing showing a sectional view of the device and method of the primary embodiment of this invention.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

The primary embodiment of this invention is shown in FIG. 1A, FIG. 1B, FIG. 1C, FIG. 1D, FIG. 1E, and FIG. 1F. Regarding FIG. 1A, apparatus 100 is shown with apparatus 100 having vessel 101, heat source 105, and condenser 104, with condenser 104 being connected to vessel 101 by transfer tube 103, and with condenser 104 having internal structure 107 and cooling jacket 109. Grain and water mixture 102 is placed in vessel 101 of apparatus 100. As heat source 105 raises the temperature of vessel 101, grain and water mixture 102 is also heated, resulting in the production of aromatized vapor 106, with aromatized vapor 106 passing through transfer tube 103 into internal structure 107 of condenser 104, whereupon heat is exchanged from aromatized vapor 106 to cooling jacket 109, with cooling input flow 108 reducing the temperature of cooling jacket 109, and with heat being carried off by cooling output flow 110. As heat is lost from aromatized vapor 106 within condenser 104, aromatized vapor goes from the gas phase to the liquid phase, resulting in condensate 111, with condensate 111 being collected in receptacle 113 as aromatized distillate 112. In some embodiments, the condenser is a shotgun condenser, a finned air condenser, or other condensers known in the art. In some embodiments, the vessel, transfer tube, and/or condenser are held at vacuum. In some embodiments, the vessel, transfer tube, and/or condenser are pressurized. In some embodiments, the vessel can be opened for filling, emptying, or cleaning, and sealed for heating by any of a variety of clamps or fasteners known in the art. In some embodiments, the vessel additionally has filling and/or emptying ports to fill or drain the vessel, respectively. In some embodiments, these drain and fill ports are valved by any of a variety of valves known in the art.

Figure 1B:
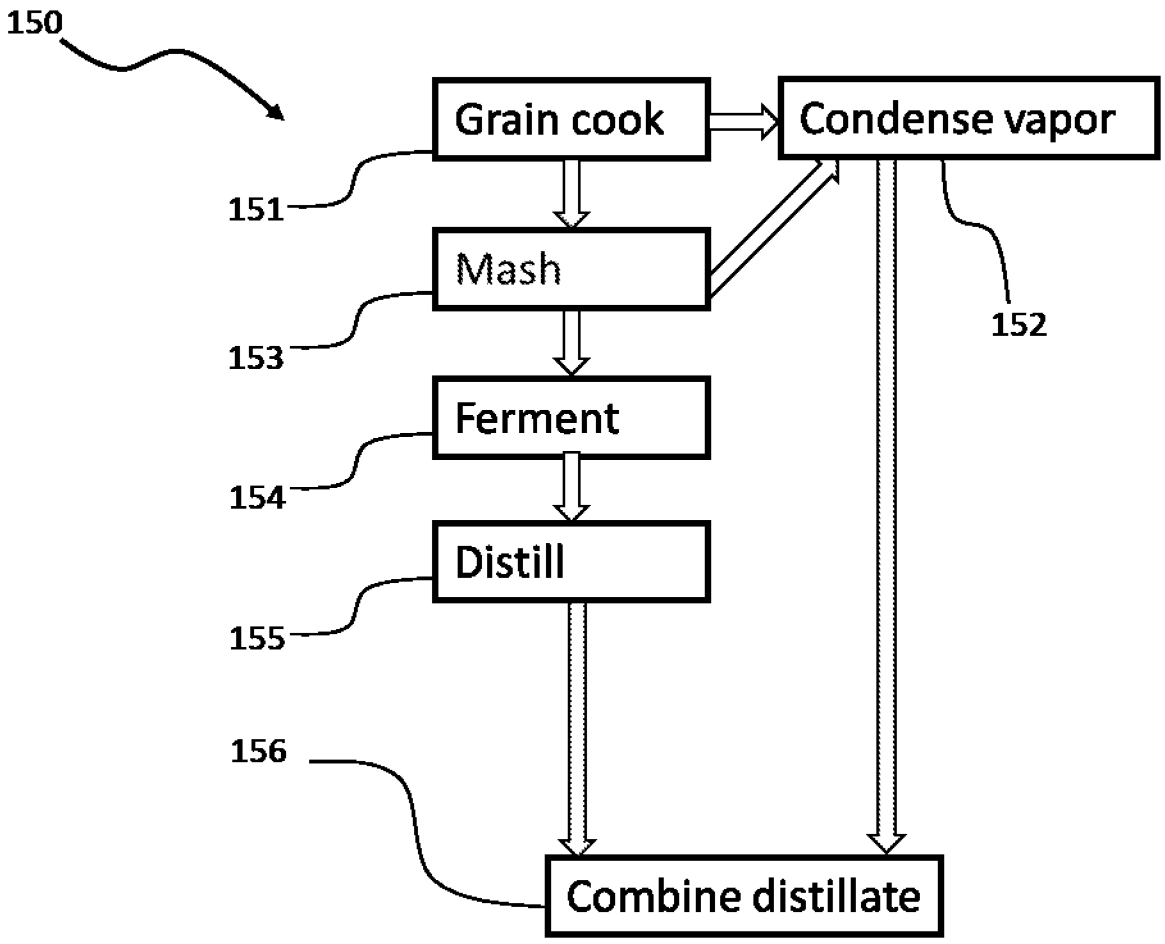
FIG. 1B is a flow chart showing the method of the primary embodiment of this invention.

A flow chart of the primary embodiment is shown in FIG. 1B, with process 150 having a series of steps. In step 151, grain is cooked. In step 153, the cooked grain is mashed, using any of a variety of methods known in the art. In step 152, which is concurrent with step 151 and/or step 153, the vapor released from the grain (and/or mash) is condensed to a liquid. In step 154, the mash is fermented, using any of a variety of methods known in the art. In step 155, the fermented mash, or a portion thereof, is distilled, using any of a variety of methods known in the art. In step 156, the distillate from the fermented mash is combined with the condensate from step 152. In some embodiments, step 151 is in a separate vessel (and no vapor condensate is collected from cooking grain). In some embodiments, step 151 is skipped. In some embodiments, step 153 is in a separate vessel (and no vapor condensate is collected from the mashing step grain).

Figure 1C:
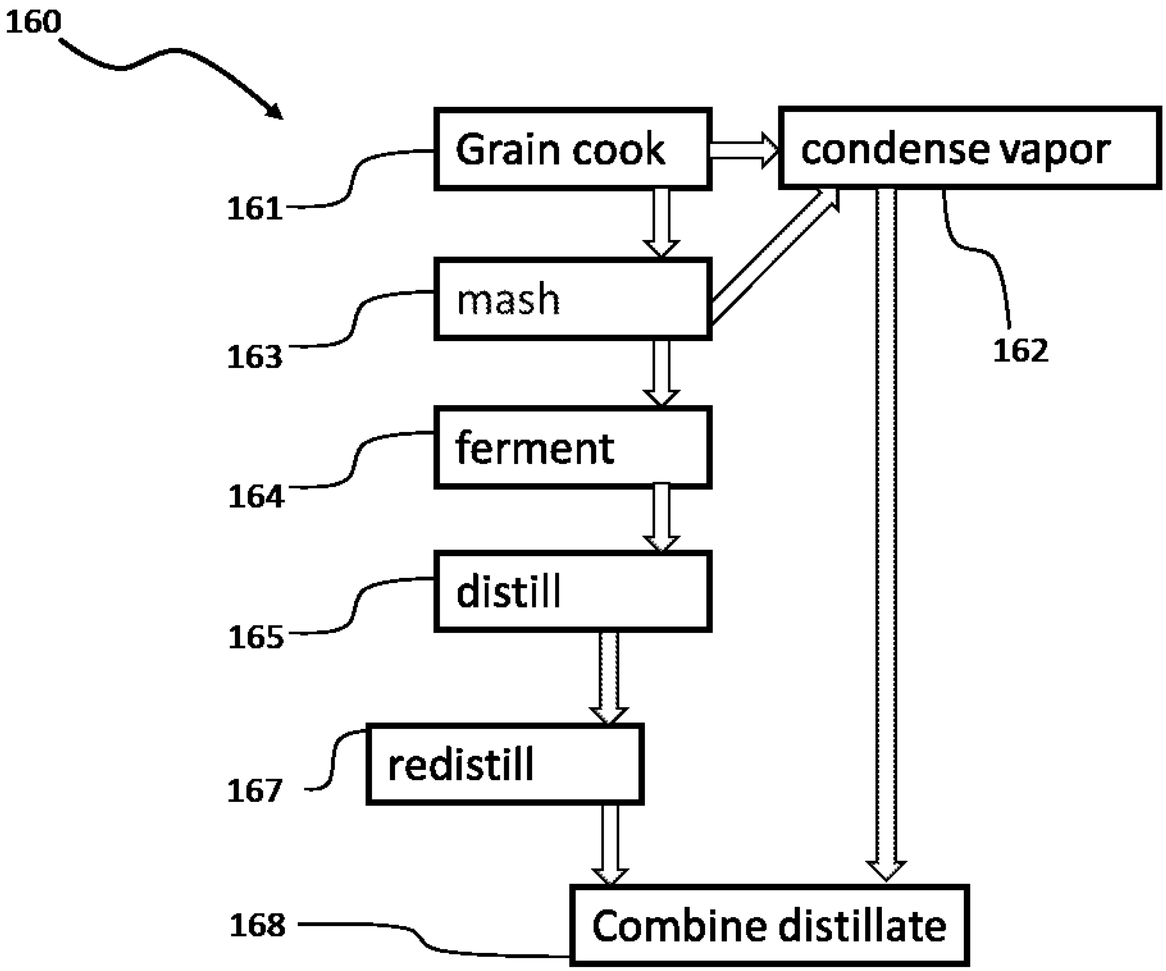
FIG. 1C is a flow chart showing a variant method of the primary embodiment of this invention.

A flow chart of a variant of the primary embodiment is shown in FIG. 1C, with process 160 having a series of steps. In step 161, grain is cooked. In step 163, the cooked grain is mashed, using any of a variety of methods known in the art. In step 162, which is concurrent with step 161 and/or step 163, the vapor released from the grain (and/or mash) is condensed to a liquid. In step 164, the mash is fermented, using any of a variety of methods known in the art. In step 165, the fermented mash, or a portion thereof, is distilled, using any of a variety of methods known in the art. In step 167, the distillate from the fermented mash is redistilled one or more times. In step 168, the re-distilled distillate from step 167 is combined with the condensate from step 162. In some embodiments, step 161 is in a separate vessel (and no vapor condensate is collected from cooking grain). In some embodiments, step 161 is skipped. In some embodiments, redistillation is conducted using a device with copper surfaces that are in contact the vapor or liquid phase. In some embodiments, step 163 is in a separate vessel (and no vapor condensate is collected from the mashing step grain).

Figure 1D:
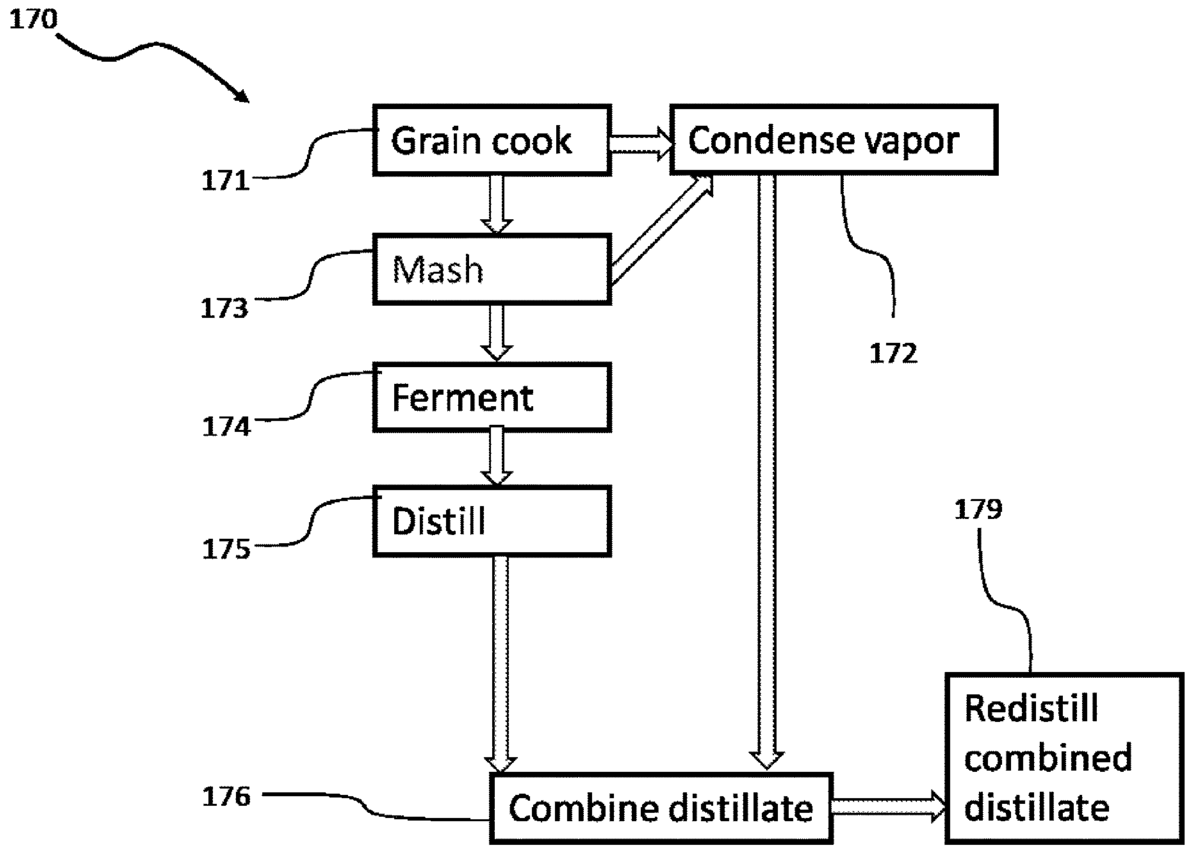
FIG. 1D is a flow chart showing an additional variant method of the primary embodiment of this invention.

A flow chart of an additional variant of the primary embodiment is shown in FIG. 1D, with process 170 having a series of steps. In step 171, grain is cooked. In step 173, the cooked grain is mashed, using any of a variety of methods known in the art. In step 172, which is concurrent with step 171 and/or step 173, the vapor released from the grain (and/or mash) is condensed to a liquid. In step 174, the mash is fermented, using any of a variety of methods known in the art. In step 175, the fermented mash, or a portion thereof, is distilled, using any of a variety of methods known in the art. In step 176 the distillate from the fermented mash is combined with the condensate from step 172. In step 179 the combined distillate is redistilled one or more times. In some embodiments, step 171 is in a separate vessel (and no vapor condensate is collected from cooking grain). In some embodiments, step 171 is skipped. In some embodiments, step 173 is in a separate vessel (and no vapor condensate is collected from the mashing step grain).

Figure 1E:
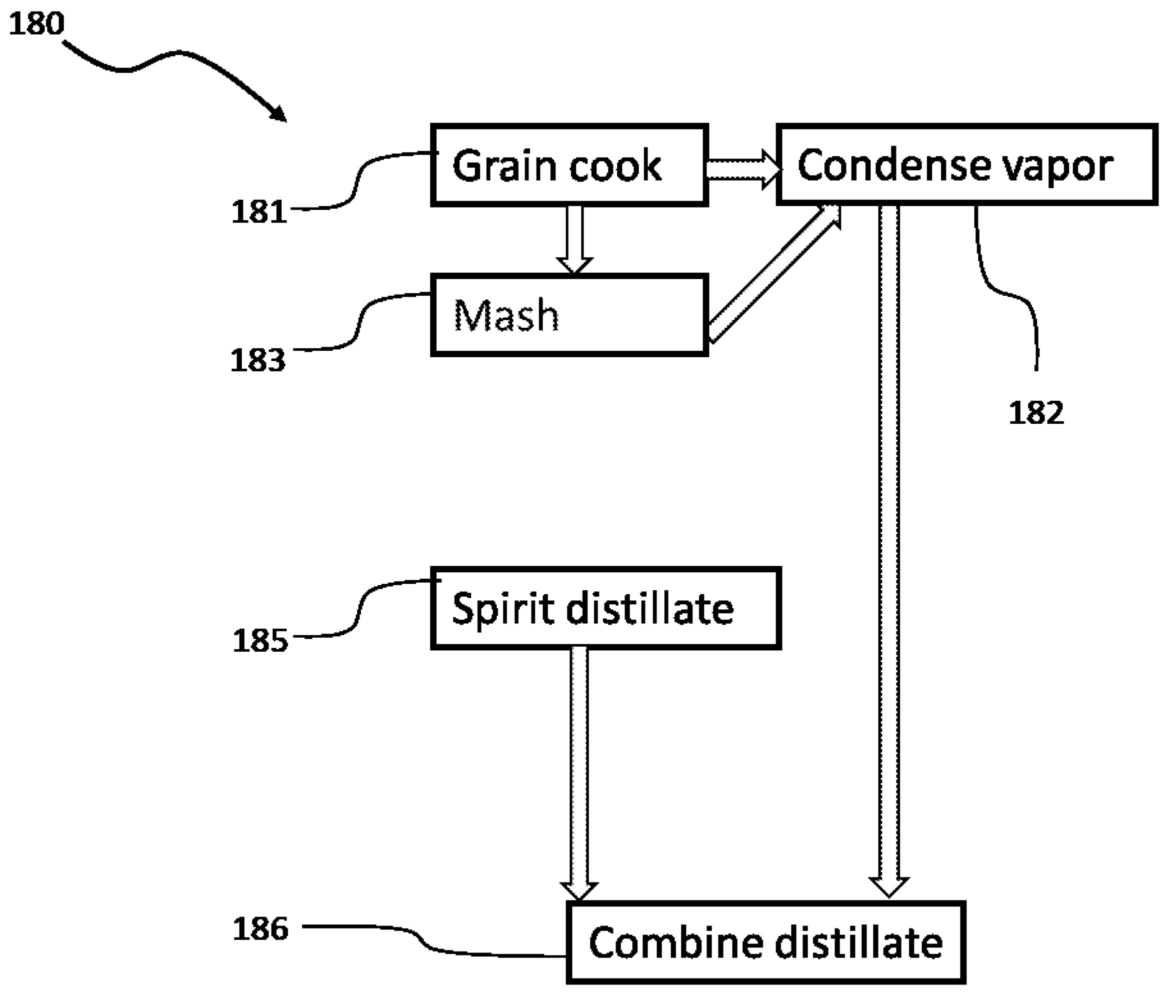
FIG. 1E is a flow chart showing another additional variant method of the primary embodiment of this invention.

A flow chart of another variant of the primary embodiment is shown in FIG. 1E, with process 180 having a series of steps. In step 181, grain is cooked. In step 183, the cooked grain is mashed, using any of a variety of methods known in the art. In step 182, which is concurrent with step 181 and/or step 183, the vapor released from the grain (and/or mash) is condensed to a liquid. In step 185, spirit distillate is produced from a separate source (i.e., not cooked grain 181 or mash 183), using any of a variety of methods known in the art to ferment and distill spirit. In step 186 spirit distillate from step 185 is combined with the condensate from step 182. In some embodiments, step 181 is in a separate vessel (and no vapor condensate is collected from cooking grain). In some embodiments, step 181 is skipped. In some embodiments, step 183 is in a separate vessel (and no vapor condensate is collected from the mashing step grain). In some embodiments, the spirit distillate is produced from a fermented grain/mash largely identical to that used to produce the aromatized condensed vapor, such as from a prior batch of the same type; for example, two sequential wheat mashes, fermentations, and distillations. In some embodiments, the spirit distillate is produced from a fermented grain/mash different to that used to produce the aromatized condensed vapor, such as spirit distillate from rice being combined with condensed vapor from cooking/mashing rye. In some embodiments, the spirit distillate is produced from a fermented sugar source other than grain/mash, such as fermented cane juice or wine, with this non-grain spirit being subsequently combined with condensed vapor from cooking grain and/or mash.

Figure 1F:
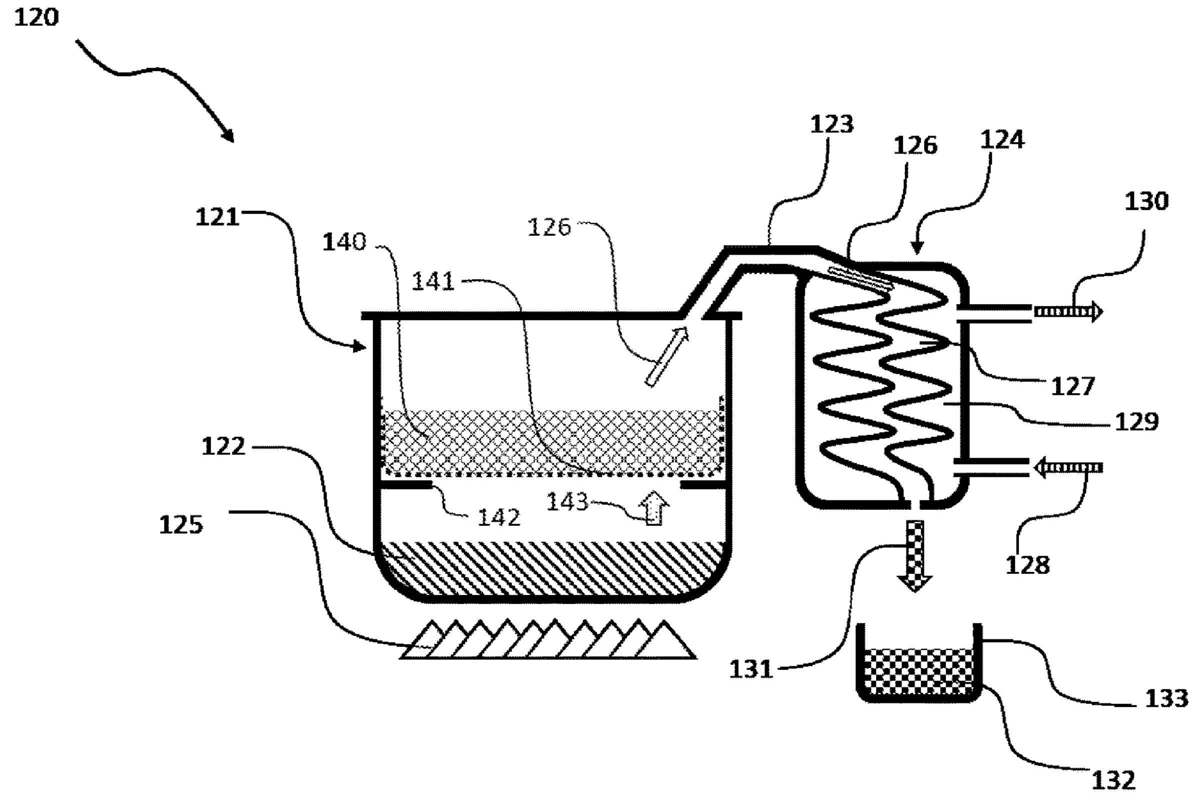
FIG. 1F is a drawing showing a sectional view of an alternate device and method of the primary embodiment of this invention.

FIG. 1F shows a variant apparatus of the primary embodiment, with apparatus 120 having vessel 121, heat source 125, and condenser 124, with condenser 124 being connected to vessel 121 by transfer tube 123, with vessel 121 having support 142 and vapor permeable container 141, and with condenser 124 having internal structure 127 and cooling jacket 129. Water 122 is placed in vessel 121 of apparatus 120. Grain 140 is placed in vapor permeable container 141 which is suspended by support 142 above the level of water 122 in vessel 121. As heat source 125 raises the temperature of vessel 121, water 122 is also heated, resulting in the production of steam 143, with steam 143 passing through vapor permeable container 141 and grain 140, resulting in the heating of grain 140 and the production of aromatized vapor 126, with aromatized vapor 126 passing through transfer tube 123 into internal structure 127 of condenser 124, whereupon heat is exchanged from aromatized vapor 126 to cooling jacket 129, with cooling input flow 128 reducing the temperature of cooling jacket 129, and with heat being carried off by cooling output flow 130. As heat is lost from aromatized vapor 126 within condenser 124, aromatized vapor 126 goes from the gas phase to the liquid phase, resulting in condensate 131, with condensate 131 being collected in receptacle 133 as aromatized distillate 132. In some embodiments, the vapor permeable container is made of a wire mesh, perforated sheet metal, woven bamboo, cloth, or other materials known in the art. In some embodiments, the condenser is a shotgun condenser, a finned air condenser, or other condensers known in the art. In some embodiments, the vessel, transfer tube, and/or condenser are held at vacuum. In some embodiments, the vessel, transfer tube, and/or condenser are pressurized.

As an example of the primary embodiment, consider a distiller who is producing grain spirit while using the apparatus and process of the primary embodiment. Through use of the apparatus and process of the primary embodiment, this distiller can capture aromas released from grain during the cooking and/or mashing steps, and this distiller can add those aromas back to distilled spirit product, allowing for a more robust flavor/aroma in the distilled spirits product. This is of particular advantage when considering high purity distilled spirits, such as those distilled to very high proof, which retain little flavor from the original grain or mash, allowing a distiller to produce cleaner spirits (in terms of undesirable fermentation by-products, which may result in off flavors or hangover) that still possess much of the desirable aroma of the grain/mash used.

As an additional example of the primary embodiment, consider a distiller who is producing grain spirit while using the apparatus and process of the primary embodiment. Through use of the apparatus and process of the primary embodiment, this distiller can capture aromas released from the cooking and mashing of highly aromatic grains, and then this distiller can add these aromas to spirit produced, in part or in full, from the fermentation and distillation of another grain or sugar source, allowing for the production of a highly aromatic and/or flavorful distilled spirit product. This is of particular advantage in cases where the highly aromatic grain is expensive or challenging to mash and/or ferment, while the bulk of the spirit is produced from inexpensive or easy-to-work-with grain or sugar sources, thus allowing for the production of a robustly flavored and/or aromatic distilled spirits product using less of the highly aromatic grain than would be required if the aromatic grain was the sole or primary source of alcohol.

The second embodiment of this invention is shown in FIG. 2A, FIG. 2B, FIG. 2C, and FIG. 2D. Regarding FIG. 2A, apparatus 200 is shown with apparatus 200 having vessel 201, heat source 205, and condenser 204, with condenser 204 being connected to vessel 201 by transfer tube 203, and with condenser 204 having internal structure 207 and cooling jacket 209. Grain and alcoholic solution 202 is placed in vessel 201 of apparatus 200. As heat source 205 raises the temperature of vessel 201, grain and alcoholic solution 202 is also heated, resulting in the production of aromatized alcoholic vapor 206, with aromatized vapor 206 passing through transfer tube 203 into internal structure 207 of condenser 204, whereupon heat is exchanged from aromatized alcoholic vapor 206 to cooling jacket 209, with cooling input flow 208 reducing the temperature of cooling jacket 209, and with heat being carried off by cooling output flow 210. As heat is lost from aromatized alcoholic vapor 206 within condenser 204, aromatized vapor 206 goes from the gas phase to the liquid phase, resulting in condensate 211, with condensate 211 being collected in receptacle 213 as aromatized alcoholic distillate 212. In some embodiments, the condenser is a shotgun condenser, a finned air condenser, or other condensers known in the art. In some embodiments, the vessel, transfer tube, and/or condenser are held at vacuum. In some embodiments, the vessel, transfer tube, and/or condenser are pressurized. In some embodiments, the vessel can be opened for filling, emptying, or cleaning, and sealed for heating by any of a variety of clamps or fasteners known in the art. In some embodiments, the vessel additionally has filling and/or emptying ports to fill or drain the vessel, respectively. In some embodiments, these drain and fill ports are valved by any of a variety of valves known in the art. In some embodiments, the alcoholic solution has been previously distilled. In some embodiments, the alcoholic solution is the undistilled product of a fermentation.

Figure 2A:
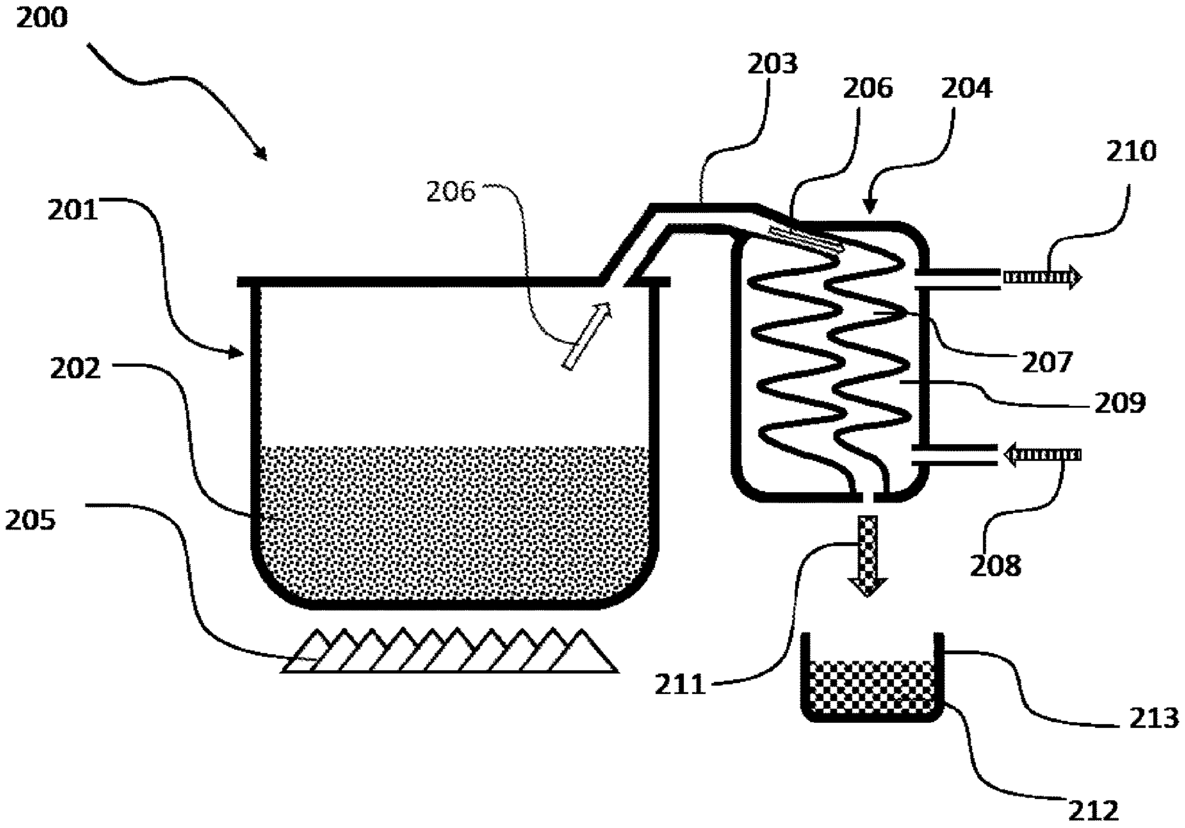
FIG. 2A is a drawing showing a sectional view of the device and method of the second embodiment of this invention.
Figure 2B:
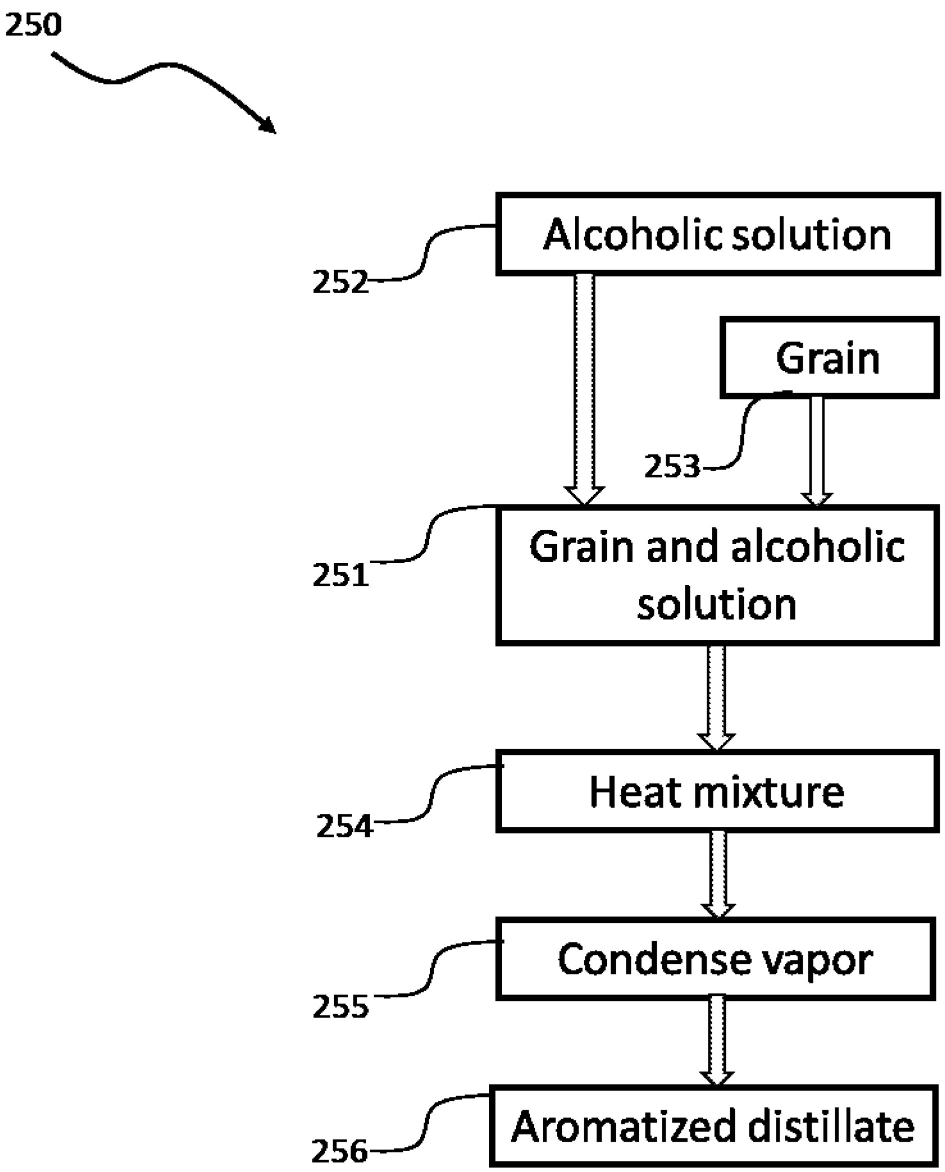
FIG. 2B is a flow chart showing the method of the second embodiment of this invention.

A flow chart of the second embodiment is shown in FIG. 2B, with process 250 having a series of steps. In step 251, grain 253 is combined with alcoholic solution 252. In step 254, the mixture of grain 253 and alcoholic solution 252 is heated, resulting in the production of vapor from the grain and alcoholic solution. In step 255, the vapor produced from heating the grain and alcoholic solution is condensed, with this condensed vapor being captured as aromatized distillate 256. In some embodiments, the alcoholic solution is the undistilled product of a fermentation, having an approximate % alcohol by volume between 4% and 25%. In some embodiments, the alcoholic solution is the result of a single distillation of a fermentation (so-called “low wines”). In some embodiments, the alcoholic solution is the result of more than one distillation of a fermentation. In some embodiments, the alcoholic solution is diluted with additional water. In some embodiments, salts or other solutes such as pH altering compounds (e.g., acids, bases, buffers) are added to the alcoholic solution prior to heating. In some embodiments, emulsifiers or surfactants are added to the alcoholic solution prior to heating. In some embodiments, the alcohol in the alcoholic solution is produced from the fermentation of the same grain that is later heated with the alcoholic solution. In some embodiments, the alcohol in the alcoholic solution is produced from the fermentation of a carbohydrate source other than the grain used that is later heated with the alcoholic solution.

Figure 2C:
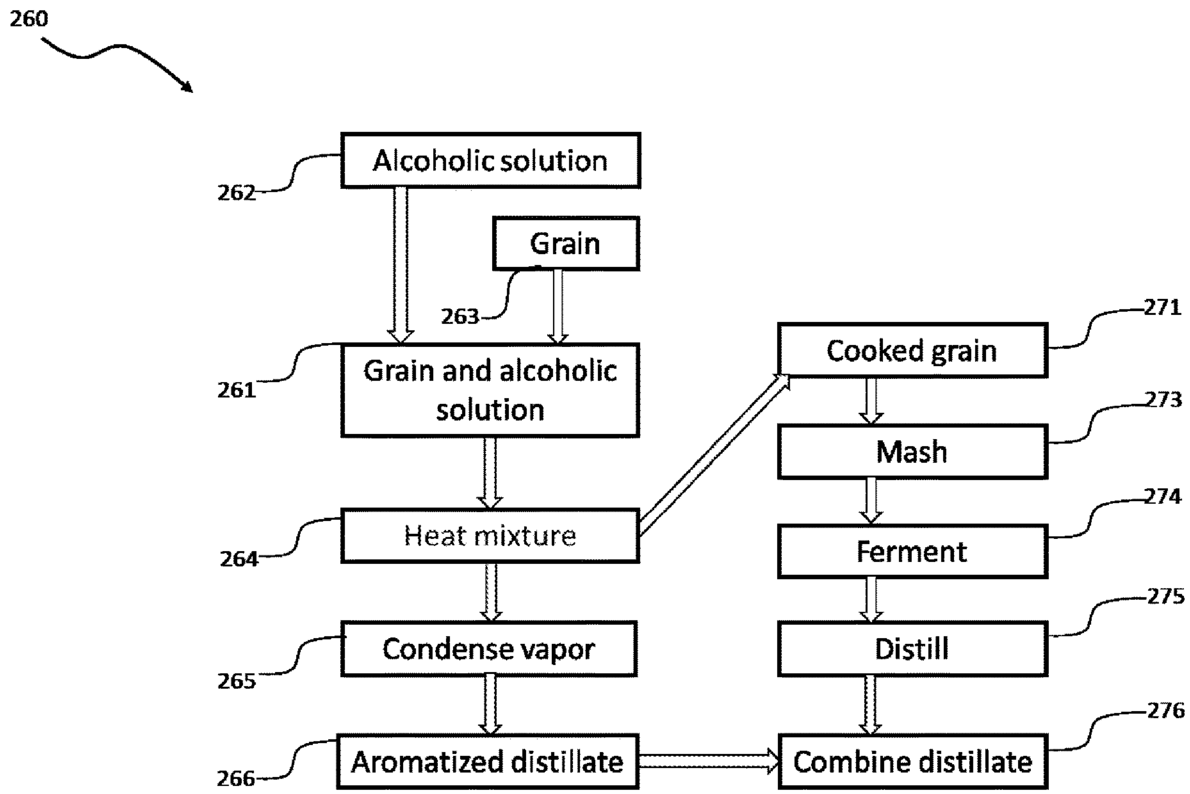
FIG. 2C is a flow chart showing a variant method of the second embodiment of this invention.

A flow chart of a variant of the second embodiment is shown in FIG. 2C, with process 260 having a series of steps. In step 261, grain 263 is combined with alcoholic solution 262. In step 264, the mixture of grain 263 and alcoholic solution 262 is heated, resulting in the production of vapor from the grain and alcoholic solution, and in the cooking of the grain. In step 265, the vapor produced from heating the grain and alcoholic solution is condensed, with this condensed vapor being captured as aromatized distillate 266. In step 271, the grain which was cooked in step 264 is recovered. In step 273, the cooked grain is mashed, using any of a variety of methods known in the art. In step 274, the mash is fermented, using any of a variety of methods known in the art. In step 275, the fermented mash is distilled, using any of a variety of methods known in the art. In step 276, the distillate from the fermented mash is combined with the condensate from step 266. In some embodiments, the distillates are not combined, and are used in separate product streams. In some embodiments, the alcohol in the alcoholic solution was produced from the fermentation of the same grain that is later cooked with the alcoholic solution. In some embodiments, the alcohol in the alcoholic solution was produced from the fermentation of a carbohydrate source other than the grain used that is later cooked with the alcoholic solution.

Figure 2D:
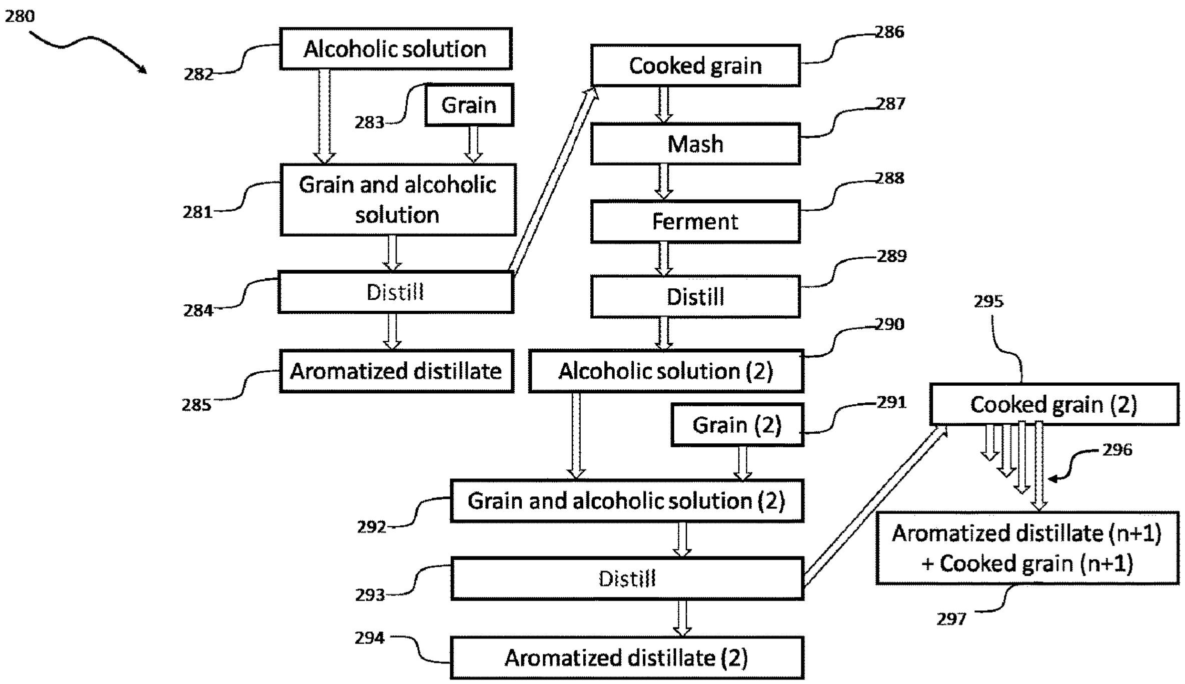
FIG. 2D is a flow chart showing an additional variant method of the second embodiment of this invention.

A flow chart of an additional variant of the second embodiment is shown in FIG. 2D, with process 280 having a series of steps. In step 281, grain 283 is combined with alcoholic solution 282. In step 284, the mixture of grain 283 and alcoholic solution 282 is distilled, using any of a variety of methods known in the art, resulting in the production of aromatized distillate 285 and cooked grain 286. In step 287, the cooked grain is mashed, using any of a variety of methods known in the art. In step 288, the mash is fermented, using any of a variety of methods known in the art. In step 289, the fermented mash is distilled one or more times, using any of a variety of methods known in the art, resulting in the formation of alcoholic solution (2) 290. In step 292, alcoholic solution (2) 290 is combined with a second batch of grain, grain (2) 291, resulting in grain and alcoholic solution (2) 292. In step 293, grain and alcoholic solution (2) 292 is distilled, using any of a variety of methods known in the art, resulting in the production of aromatized distillate (2) 294 and cooked grain (2) 295. Such a process can be repeated for one or more cycles in steps 296, resulting in the production of additional aromatized distillate (n+1) and cooked grain (n+1) 297, wherein each batch of aromatized distillate produced provides cooked grain for the subsequent batch. In some embodiments, the aromatized distillates are combined.

As an example of the second embodiment, consider a distiller who is producing grain spirit while using the apparatus and process of the second embodiment. Through use of the apparatus and process of the second embodiment, this distiller can capture aromas released from the cooking and mashing of highly aromatic grains, and then this distiller can add these aromas to spirit produced, in part or in full, from the fermentation and distillation of another grain or sugar source, allowing for the production of a highly aromatic and/or flavorful distilled spirit product. This is of particular advantage in cases where the highly aromatic grain is expensive or challenging to mash and/or ferment, while the bulk of the spirit is produced from inexpensive or easy-to-work-with grain or sugar sources, thus allowing for the production of a robustly flavored and/or aromatic distilled spirits product using less of the highly aromatic grain than would be required if the aromatic grain was the sole or primary source of fermentable material used to produce alcohol.

As an additional example of the second embodiment, consider a distiller who is producing grain spirit while using the apparatus and process of the second embodiment. Through use of the apparatus and process of the second embodiment, this distiller can capture aromas released from grain during the cooking and/or mashing steps, and this distiller can add those aromas back to the distilled spirit product, allowing for a more robust flavor/aroma in the distilled spirits product. This is of particular advantage when considering high purity distilled spirits, such as those distilled to very high proof, which retain little flavor from the original grain or mash, allowing a distiller to produce cleaner spirits (in terms of undesirable fermentation by-products, which may result in off flavors or hangover) that still possess much of the desirable aroma of the grain/mash used.

As another example of the second embodiment, consider a distiller who is producing grain spirit while using the apparatus and process of the second embodiment. Through use of the apparatus and process of the second embodiment, this distiller can cook the grain for subsequent mashes and fermentations using ‘waste’ heat from prior distillations, allowing for lower energy and lower cost and more environmentally friendly production of the distilled spirits product.

Figure 3A:
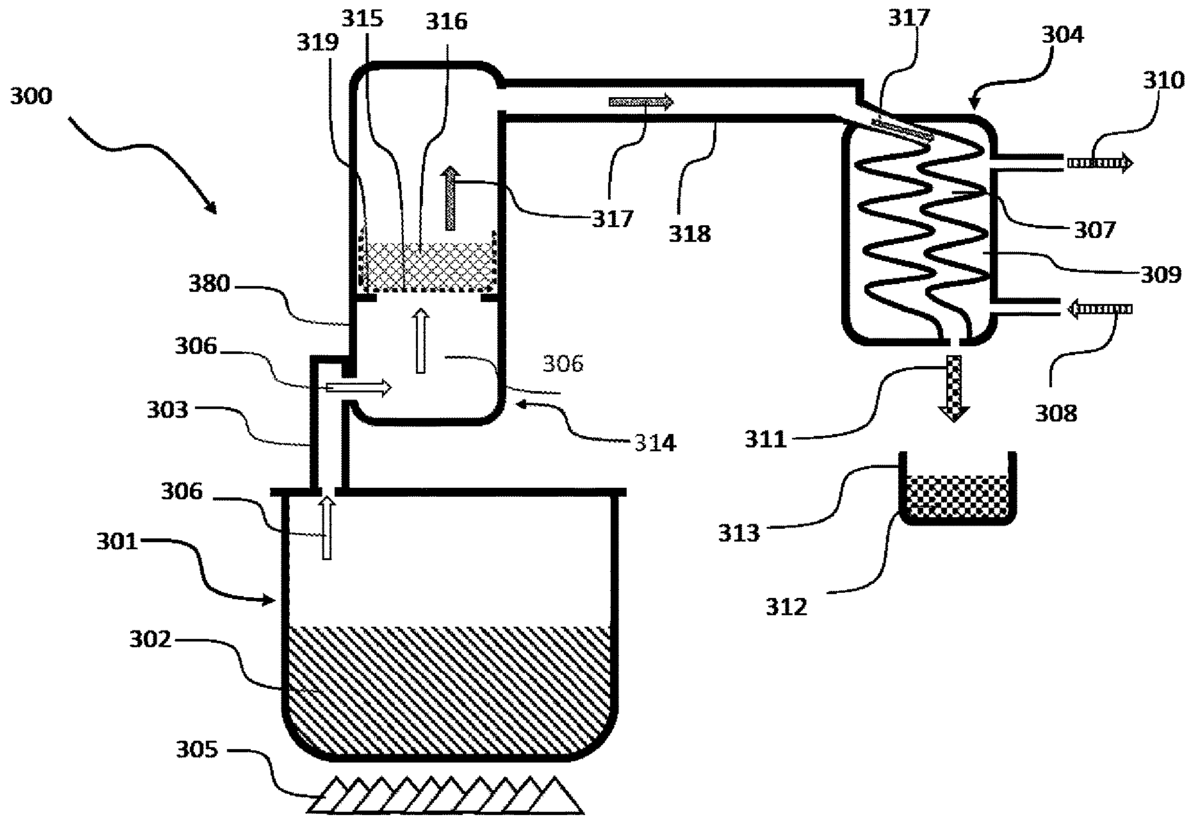
FIG. 3A is a drawing showing the device and method of the third embodiment.

The third embodiment of this invention is shown in FIG. 3A, FIG. 3B, FIG. 3C, and FIG. 3D. FIG. 3A shows the apparatus of the third embodiment, with apparatus 300 having vessel 301, heat source 305, extraction chamber 314, and condenser 304, with condenser 304 being connected to extraction chamber 314 by transfer tube 318, with extraction chamber 314 being connected to vessel 301 by riser 303, with extraction chamber 314 having enclosure 380, support 319, and vapor permeable container 315, and with condenser 304 having internal structure 307 and cooling jacket 309. Alcoholic solution 302 is placed in vessel 301 of apparatus 300. Grain 316 is placed in vapor permeable container 315 which is suspended by support 319 in extraction chamber 314. As heat source 305 raises the temperature of vessel 301, alcoholic solution 302 is heated, resulting in the production of alcoholic vapor 306. Alcoholic vapor 306 passes through riser 303 and into extraction chamber 314, with alcoholic vapor 306 then passing through vapor permeable container 315 and grain 316, resulting in the heating of grain 316 and the production of aromatized vapor 317, with aromatized vapor 317 passing through transfer tube 318 into internal structure 307 of condenser 304, whereupon heat is exchanged from aromatized vapor 317 to cooling jacket 309, with cooling input flow 308 reducing the temperature of cooling jacket 309, and with heat being carried off by cooling output flow 310. As heat is lost from aromatized vapor 317 within condenser 304, aromatized vapor 317 goes from the gas phase to the liquid phase, resulting in condensate 311, with condensate 311 being collected in receptacle 313 as aromatized distillate 312. In some embodiments, the vapor permeable container is made of a wire mesh, perforated sheet metal, woven bamboo, cloth, or other materials known in the art. In some embodiments the condenser is a shotgun condenser, a finned air condenser, or other condensers known in the art. In some embodiments, the vessel, riser, extraction chamber, transfer tube, and/or condenser are held at vacuum. In some embodiments, the vessel, riser, extraction chamber, transfer tube, and/or condenser are pressurized. In some embodiments, the vessel and/or extraction chamber can be opened for filling, emptying, or cleaning, and sealed for heating by any of a variety of clamps or fasteners known in the art. In some embodiments, the vessel and/or extraction chamber additionally has filling and/or emptying ports to fill or drain the vessel, respectively. In some embodiments, these drain and fill ports are valved by any of a variety of valves known in the art. In some embodiments, there are one or more plates in the riser, including perforated plates, bubble cap plates, valved plates, or other vapor-liquid interaction surfaces known in the art. In some embodiments, the alcoholic solution is diluted with additional water. In some embodiments, salts or other solutes such as pH altering compounds (e.g., acids, bases, buffers) are added to the alcoholic solution prior to heating. In some embodiments, emulsifiers or surfactants are added to the alcoholic solution prior to heating. In some embodiments, the riser contains “column packing” material, including copper mesh, Raschig rings, or other column packing material known in the art. In some embodiments, the riser is an empty tube that does not contain plates or column packing material.

Figure 3B:
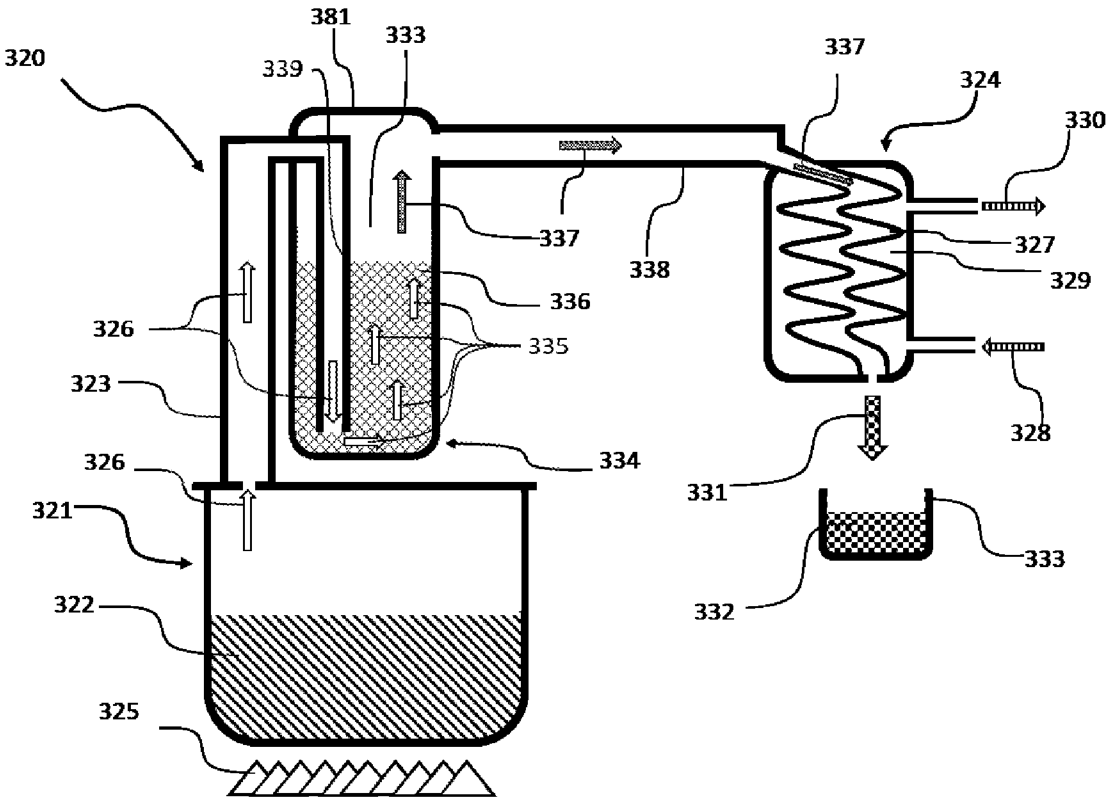
FIG. 3B is a drawing showing a sectional view of a variant device and method of the third embodiment of this invention.

FIG. 3B shows a variant apparatus of the third embodiment, with apparatus 320 having vessel 321, heat source 325, extraction chamber 334, and condenser 324, with condenser 324 being connected to extraction chamber 334 by transfer tube 338, with extraction chamber 334 being connected to vessel 321 by riser 323, with extraction chamber 334 having enclosure 381, lumen 333 and downpipe 339, and with condenser 324 having internal structure 327 and cooling jacket 329. Alcoholic solution 322 is placed in vessel 321 of apparatus 320. Grain 336 is placed in lumen 333 of extraction chamber 334, with downpipe 339 extending beneath the level of grain 336 in lumen 333. As heat source 325 raises the temperature of vessel 321, alcoholic solution 322 is heated, resulting in the production of alcoholic vapor 326. Alcoholic vapor 326 passes through riser 323 and into extraction chamber 334, with alcoholic vapor 326 then passing through downpipe 339 and into grain 336. In some embodiments, grain 336 is moistened by condensing vapor from alcoholic vapor 326 during the extraction process. In some embodiments, liquid is added to grain 336 prior to the extraction process. As alcoholic vapor 326 moves out of downpipe 339 into grain 336, bubbles 335 rise through grain 336, resulting in the heating of grain 336 and the production of aromatized vapor 337, with aromatized vapor 337 passing through transfer tube 338 into internal structure 327 of condenser 324, whereupon heat is exchanged from aromatized vapor 337 to cooling jacket 329, with cooling input flow 328 reducing the temperature of cooling jacket 329, and with heat being carried off by cooling output flow 330. As heat is lost from aromatized vapor 337 within condenser 324, aromatized vapor 337 goes from the gas phase to the liquid phase, resulting in condensate 331, with condensate 331 being collected in receptacle 333 as aromatized distillate 332. In some embodiments the condenser is a shotgun condenser, a finned air condenser, or other condensers known in the art. In some embodiments, the vessel, riser, extraction chamber, transfer tube, and/or condenser are held at vacuum. In some embodiments, the vessel, riser, extraction chamber, transfer tube, and/or condenser are pressurized. In some embodiments, there is more than one downpipe. In some embodiments, the vessel and/or extraction chamber can be opened for filling, emptying, or cleaning, and sealed for heating by any of a variety of clamps or fasteners known in the art. In some embodiments, the vessel and/or extraction chamber additionally has filling and/or emptying ports to fill or drain the vessel, respectively. In some embodiments, these drain and fill ports are valved by any of a variety of valves known in the art. In some embodiments, there are one or more plates in the riser, including perforated plates, bubble cap plates, valved plates, or other vapor-liquid interaction surfaces known in the art. In some embodiments, the riser contains "column packing" material, including wire mesh, Raschig rings, or other column packing material known in the art. In some embodiments, the riser is an empty tube that does not contain plates or column packing material.

Figure 3C:
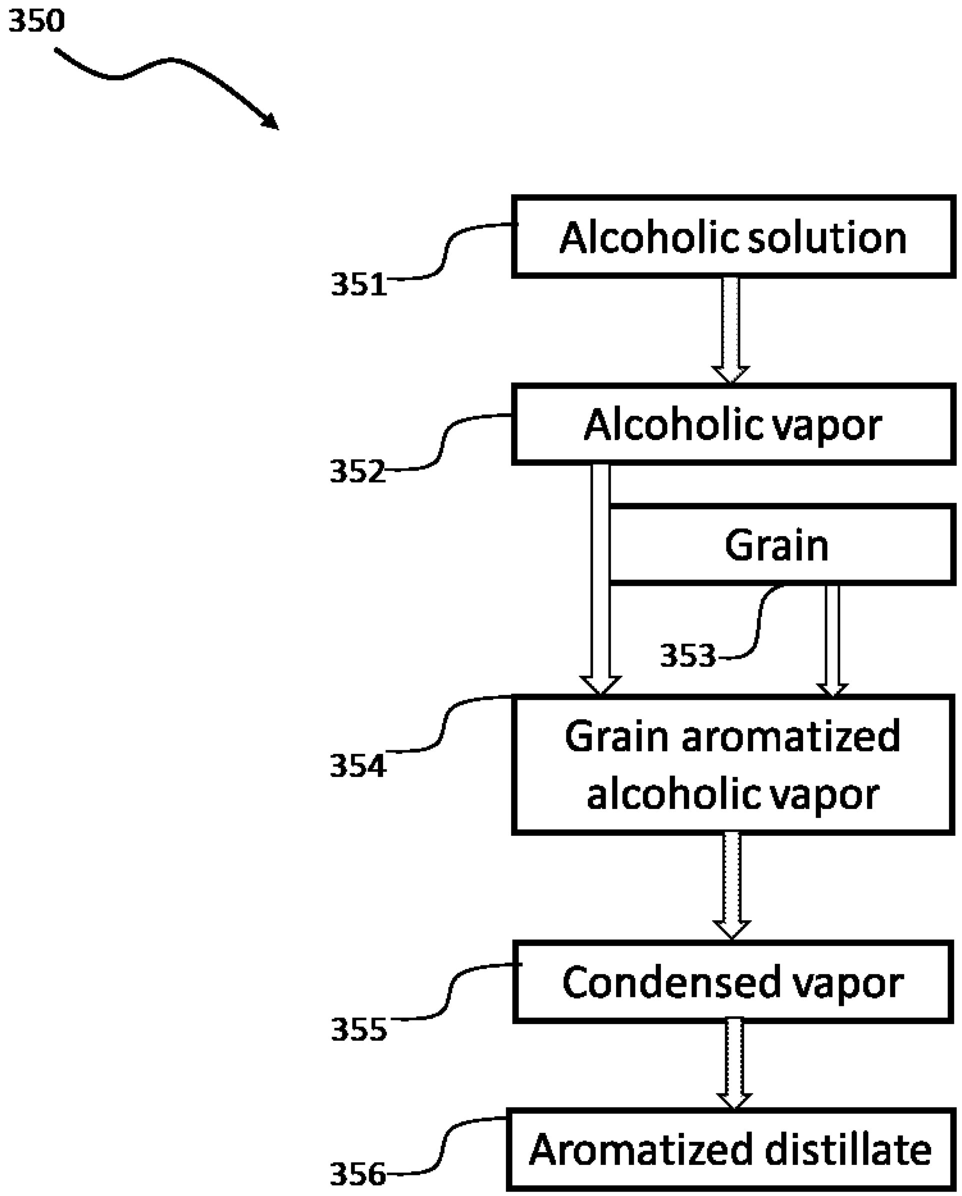
FIG. 3C is a flow chart showing the method of the third embodiment of this invention.

A flow chart of the third embodiment is shown in FIG. 3C, with process 350 having a series of steps. Alcoholic solution 351 is heated, resulting in the production of alcoholic vapor 352. Alcoholic vapor 352 then is passed through, and interacts with, grain 353, resulting in the production of grain aromatized alcoholic vapor 354. Grain aromatized alcoholic vapor 354 is then condensed to condensed vapor 355, and condensed vapor 355 is collected as aromatized distillate 356. In some embodiments, the alcoholic solution is the undistilled product of a fermentation, having an approximate % alcohol by volume between 4% and 25%. In some embodiments, the alcoholic solution is the result of a single distillation of a fermentation (so-called "low wines"). In some embodiments, the alcoholic solution is the result of more than one distillation of a fermentation. In some embodiments, the alcoholic solution is diluted with additional water. In some embodiments, salts or other solutes such as pH altering compounds (e.g., acids, bases, buffers) are added to the alcoholic solution prior to heating. In some embodiments, emulsifiers or surfactants are added to the alcoholic solution prior to heating. In some embodiments, the alcohol in the alcoholic solution was produced from the fermentation of the same grain that is later heated with the alcoholic solution. In some embodiments, the alcohol in the alcoholic solution was produced from the fermentation of a carbohydrate source other than the grain used that is later heated with the alcoholic solution.

Figure 3D:
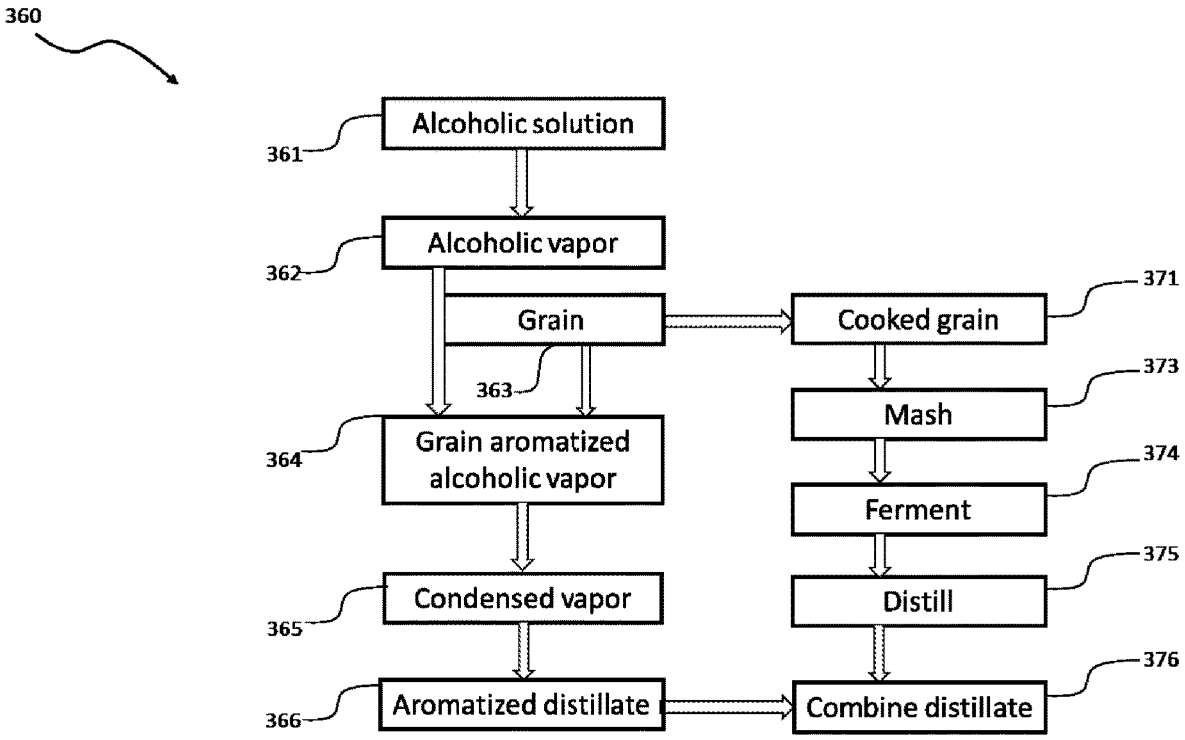
FIG. 3D is a flow chart showing a variant method of the third embodiment of this invention.

A flow chart of a variant of the third embodiment is shown in FIG. 3D, with process 360 having a series of steps. Alcoholic solution 361 is heated, resulting in the production of alcoholic vapor 362. Alcoholic vapor 362 is then passed through, and interacts with, grain 363, resulting in the production of grain aromatized alcoholic vapor 364 and cooked grain 371. Grain aromatized alcoholic vapor 364 is then condensed to condensed vapor 365, and condensed vapor 365 is collected as aromatized distillate 366. In step 373, cooked grain 371 is mashed, using any of a variety of methods known in the art. In step 374, the mash is fermented, using any of a variety of methods known in the art. In step 375, the fermented mash is distilled, using any of a variety of methods known in the art. In step 376, the distillate from step 375 is combined with aromatized distillate 366, forming a combined distillate 376. In some embodiments, the distillates are not combined, and are used in separate product streams. In some embodiments, the alcohol in the alcoholic solution is produced from the fermentation of the same grain that is later heated with the alcoholic solution. In some embodiments, the alcohol in the alcoholic solution is produced from the fermentation of a carbohydrate source other than the grain used that is later heated with the alcoholic solution. In some embodiments, each batch of aromatized distillate produced provides cooked grain for the subsequent batch, and each batch of grain provides aroma for the prior batch.

Figure 3E:
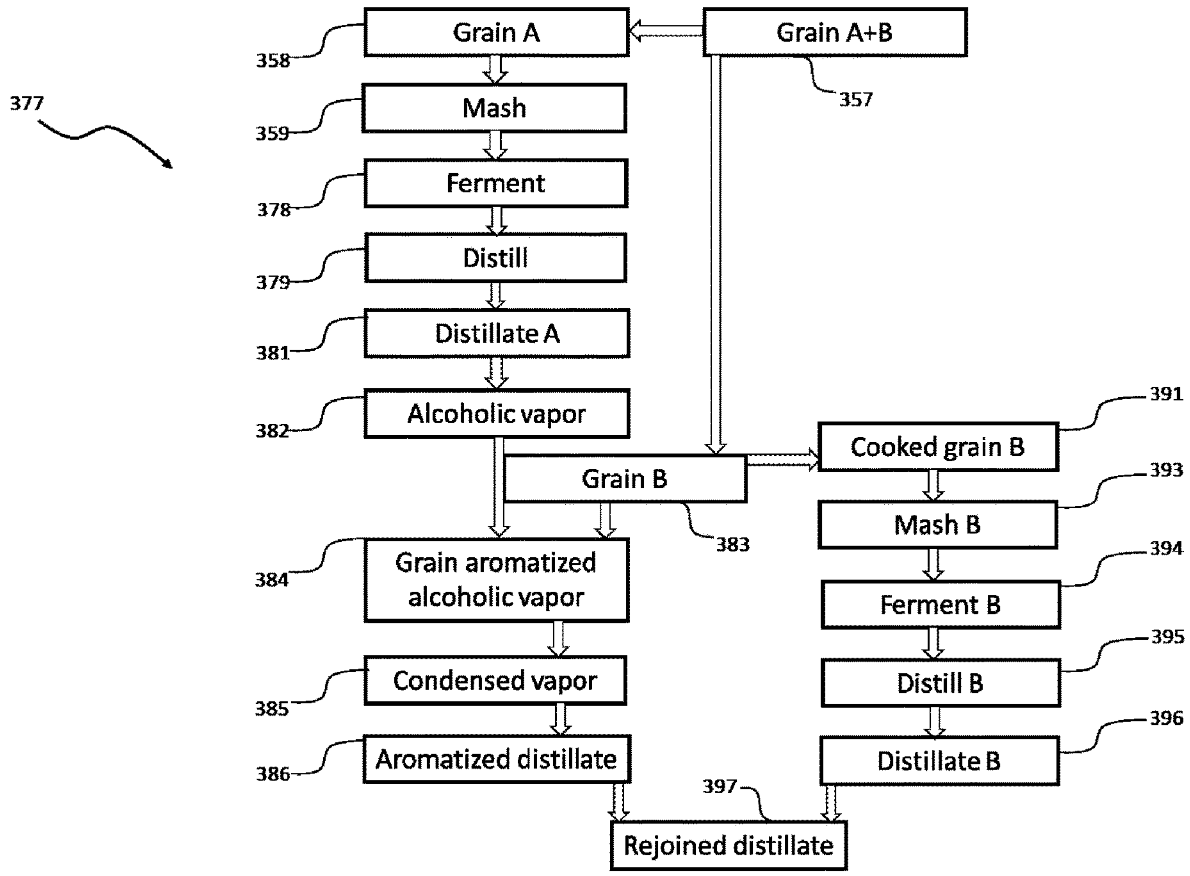
FIG. 3E is a flow chart showing an additional variant method of the third embodiment of this invention.

A flow chart of another variant of the third embodiment is shown in FIG. 3E, with process 377 having a series of steps. Grain A+B 357 is first divided into two portions, grain A 358 and grain B 383. Grain A 358 is then mashed in mash 359, using any of a variety of methods known in the art. Mash 359 is then fermented in ferment 378, and the fermented material from ferment 378 is distilled to an alcoholic distillate in distill 379, resulting in distillate A 381. Distillate A 381 is heated, resulting in the production of alcoholic vapor 382. Alcoholic vapor 382 is then passed through, and interacts with, grain B 383, resulting in the production of grain aromatized alcoholic vapor 384 and cooked grain B 391. Grain aromatized alcoholic vapor 384 is then condensed to condensed vapor 385, and condensed vapor 385 is collected as aromatized distillate 386. In step 393, cooked grain B 391 is mashed, using any of a variety of methods known in the art. In step 394, the mash of grain B 393 is fermented, using any of a variety of methods known in the art, producing ferment B 394. Ferment B 394 is then distilled in distill B 395, using any of a variety of methods known in the art, producing distillate B 396. In step 397, distillate B 396 is combined with aromatized distillate 386, forming rejoined distillate 397. In some embodiments, the rejoined distillate is distilled again.

As an example of the third embodiment, consider a distiller who is producing grain spirit while using the apparatus and process of the third embodiment. Through use of the apparatus and process of the third embodiment, this distiller can capture aromas released from the cooking and mashing of highly aromatic grains, and then this distiller can add these aromas to spirit produced, in part or in full, from the fermentation and distillation of another grain or sugar source, allowing for the production of a highly aromatic and/or flavorful distilled spirit product. This is of particular advantage in cases where the highly aromatic grain is expensive or challenging to mash and/or ferment, while the bulk of the spirit is produced from inexpensive or easy-to-work-with grain or sugar sources, thus allowing for the production of a robustly flavored and/or aromatic distilled spirits product using less of the highly aromatic grain than would be required if the aromatic grain was the sole or primary source of alcohol.

As an additional example of the third embodiment, consider a distiller who is producing grain spirit while using the apparatus and process of the third embodiment. Through use of the apparatus and process of the third embodiment, this distiller can capture aromas released from grain during the cooking and/or mashing steps, and this distiller can add those aromas back to distilled spirit product, allowing for a more robust flavor/aroma in the distilled spirits product. This is of particular advantage when considering high purity distilled spirits, such as those distilled to very high proof, which retain little flavor from the original grain or mash, allowing a distiller to produce cleaner spirits (in terms of undesirable fermentation by-products, which may result in off flavors or hangover) that still possess much of the desirable aroma of the grain/mash used.

Figure 4A:
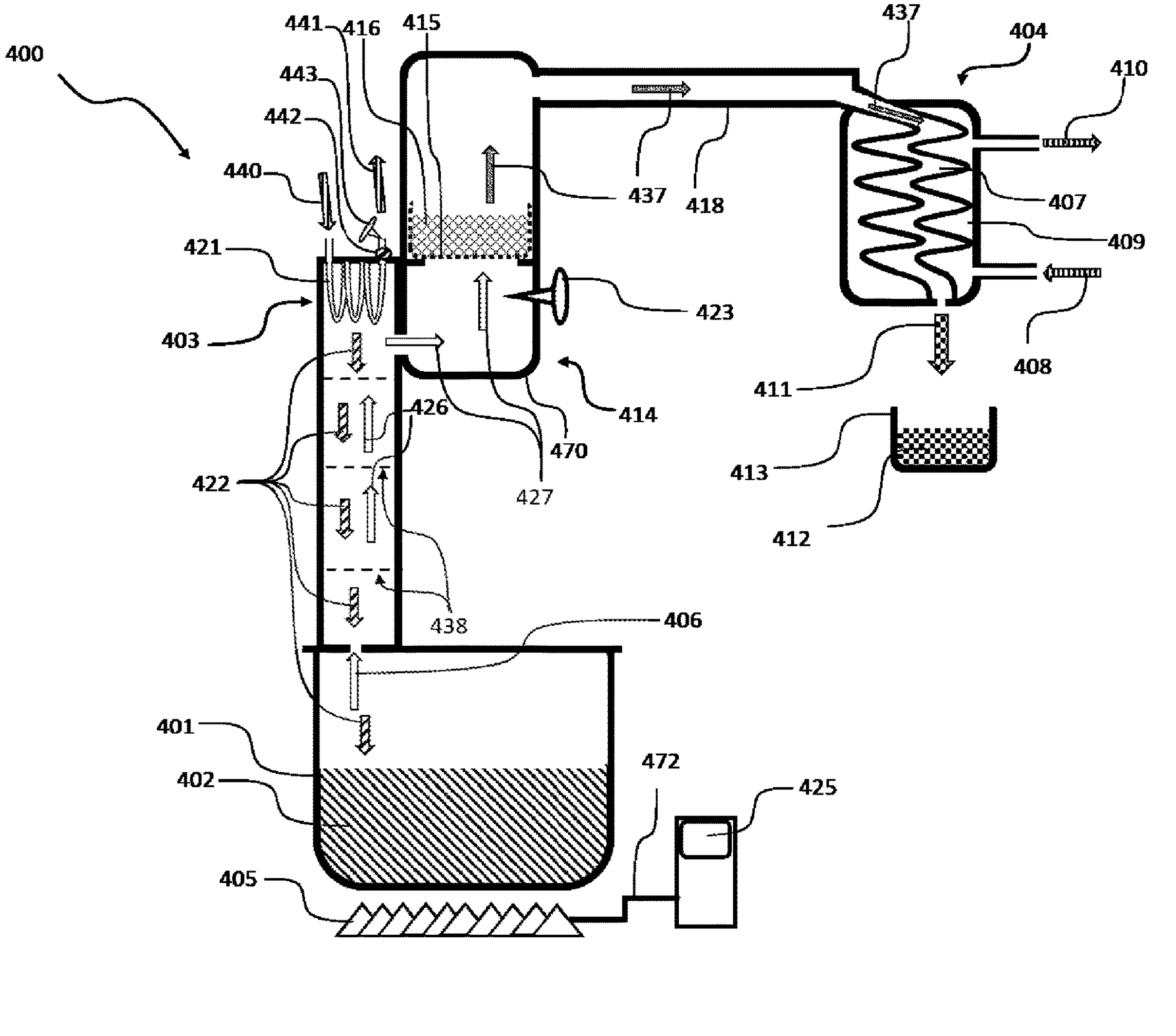
FIG. 4A is a drawing showing a sectional view of the device and method of the fourth embodiment of this invention.
Figure 4B:
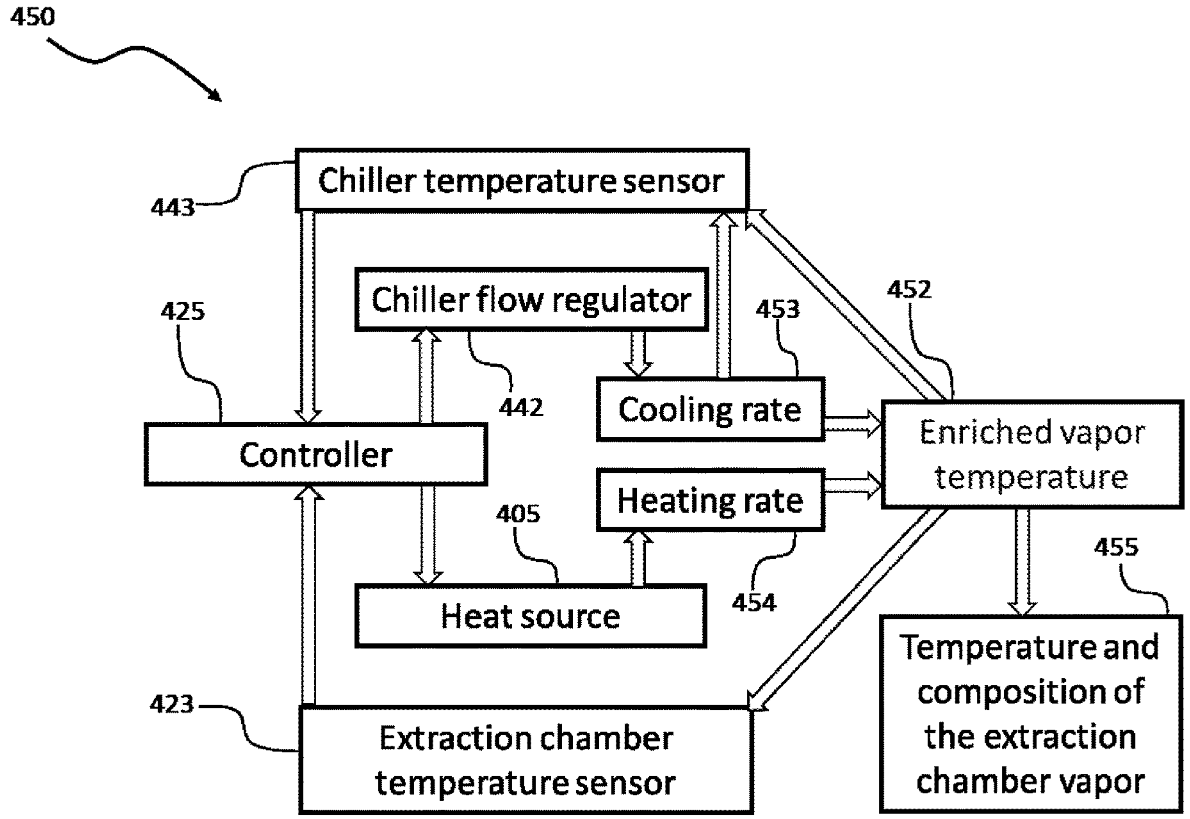
FIG. 4B is a box diagram showing the systems in communication in the fourth embodiment of this invention.
Figure 4C:
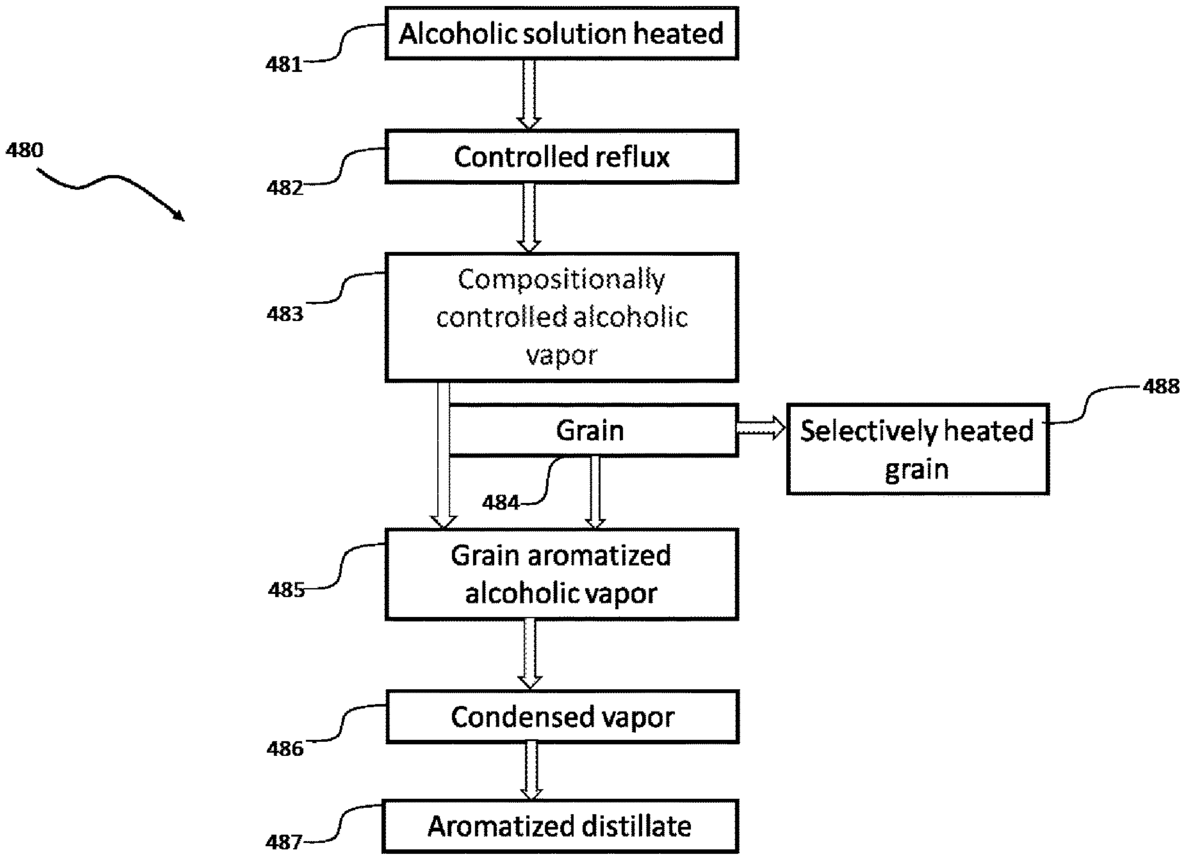
FIG. 4C is a flow chart showing the method of the fourth embodiment of this invention.

The fourth embodiment of this invention is shown in FIG. 4A, FIG. 4B, and FIG. 4C. FIG. 4A shows the apparatus of the fourth embodiment, with apparatus 400 having vessel 401, heat source 405, reflux column 403, controller 425, extraction chamber 414, and condenser 404, with condenser 404 being connected to extraction chamber 414 by transfer tube 418, with extraction chamber 414 being connected to reflux column 403, and with reflux column 403 being connected to vessel 401. Condenser 404 has internal structure 407 and cooling jacket 409. Extraction chamber 414 has enclosure 470, vapor permeable container 415, and extraction chamber temperature sensor 423, with extraction chamber temperature sensor 423 measuring the temperature within extraction chamber 414. Reflux column 403 has exchange surfaces 438, chiller 421, chiller flow regulator 442, and chiller temperature sensor 443, with the rate of cooling of chiller 421 being regulated by chiller flow regulator 442, which modulates the flow of cooling input 440 and cooling output 441, and with chiller temperature sensor 443 measuring the temperature of cooling output 441 and/or chiller 421. Alcoholic solution 402 is placed in vessel 401 of apparatus 400. Grain 416 is placed in vapor permeable container 415 of extraction chamber 414. As heat source 405 raises the temperature of vessel 401, alcoholic solution 402 is heated, resulting in the production of alcoholic vapor 406. Alcoholic vapor 406 rises into reflux column 403, at which point alcoholic vapor 406 contacts with exchange surfaces 438, whereupon alcoholic vapor 406 interacts with liquid reflux 422. As alcohol has a lower boiling point than water, the interactions on exchange surfaces 438 result in an increase in the concentration of alcohol in the vapor, as enriched vapor 426 moves upward in reflux column 403 and across more exchange surfaces 438, until enriched vapor 426 reaches the apex of the column 403, whereupon some enriched vapor 426 is cooled and condensed by chiller 421, resulting in the formation of liquid reflux 422, and the remainder of enriched vapor 426 enters extraction chamber 414 as enriched alcoholic vapor 427. Enriched alcoholic vapor 427 then passes through vapor permeable container 415 and grain 416, resulting in the heating of grain 416 and the production of aromatized vapor 437, with aromatized vapor 437 passing through transfer tube 418 into internal structure 407 of condenser 404, whereupon heat is exchanged from aromatized vapor 437 to cooling jacket 409, with cooling input flow 408 reducing the temperature of cooling jacket 409, and with heat being carried off by cooling output flow 410. As heat is lost from aromatized vapor 437 within condenser 404, aromatized vapor 437 goes from the gas phase to the liquid phase, resulting in condensate 411, with condensate 411 being collected in receptacle 413 as aromatized distillate 412. Controller 425 is in communication with extraction chamber temperature sensor 423, chiller temperature sensor 443, chiller flow regulator 442, and heat source 405, with controller 425 affecting the heat output of heat source 405 via control heat mechanism 472, and with controller 425 affecting the cooling rate of chiller 421 through the setting of chiller flow regulator 442.

In some embodiments, the vapor permeable container is made of a wire mesh, perforated sheet metal, woven bamboo, cloth, or other materials known in the art. In some embodiments, the condenser is a shotgun condenser, a finned air condenser, or other condensers known in the art. In some embodiments, the vessel, column, extraction chamber, transfer tube, and/or condenser are held at vacuum. In some embodiments, the vessel, riser, extraction chamber, transfer tube, and/or condenser are pressurized. In some embodiments, the exchange surface is one or more plate(s) or tray(s) in the reflux column, including perforated plates, bubble cap plates, valved plates, or other vapor-liquid interaction surfaces known in the art. In some embodiments, the riser contains “column packing” material, including copper mesh, Raschig rings, or other column packing material known in the art. In some embodiments, the reflux column does not contain plates or column packing material. In some embodiments, enriched vapor passes through and/or across the chiller. In some embodiments, the chiller is a dephlegmator, a shotgun condenser, a coil condenser, a Liebig condenser, a cold finger condenser, a Friedrichs condenser, or other condenser or chiller type known in the art. In some embodiments, temperature sensors are in alternate positions. In some embodiments, the chiller flow regulator is a valve or pump. In some embodiments, the chiller flow regulator is in an alternate position. In some embodiments, the chiller flow regulator and/or chiller temperature sensor are absent. In some embodiments, the chiller is not at the top of the reflux column. In some embodiments, there are some additional exchange surfaces above the chiller. In some embodiments, there is no flow regulator and/or no reflux sensor. In some embodiments, there are additional temperature sensors, in communication with the controller. In some embodiments, the controller is a computer, cloud application, PID controller, PLC controller, algorithm, microprocessor, or any other controller type known in the art. In some embodiments, the temperature sensors and/or heat/cooling controls are manually readable and actuatable, with a person acting as a controller and affecting heating and cooling controls in response to read temperatures. In some embodiments, salts or other solutes such as pH altering compounds (e.g., acids, bases, buffers) are added to the alcoholic solution prior to heating. In some embodiments, emulsifiers or surfactants are added to the alcoholic solution prior to heating. In some embodiments, the vessel and/or extraction chamber can be opened for filling, emptying, or cleaning, and sealed for heating by any of a variety of clamps or fasteners known in the art. In some embodiments, the vessel and/or extraction chamber additionally has filling and/or emptying ports to fill or drain the vessel, respectively. In some embodiments, these drain and fill ports are valved by any of a variety of valves known in the art.

FIG. 4B shows the systems in communication 450 in the fourth embodiment. Controller 425 receives data from chiller temperature sensor 443 and extraction chamber temperature sensor 423, with controller 425 using these data to affect the heating rate 454 of the system through control of heat source 405, or the cooling rate 453 of the reflux column 403 (not shown in this figure) through chiller flow regulator 442. The equilibrium resulting from both heating rate 454 and cooling rate 453 results in enriched vapor temperature 452, with extraction chamber temperature sensor 423 directly measuring enriched vapor temperature 452, and with chiller temperature sensor 443 being impacted by both enriched vapor temperature 452 and cooling rate 453. In this way, controller 425 can regulate heating rate 454 and cooling rate 453 to affect a specific enriched vapor temperature 452. As the temperature of a mixed vapor with components of differing boiling points, such as water and alcohol, is determined by the percent composition of each component, by controlling enriched vapor temperature 452, controller 425 is able to control both the temperature and the composition of the extraction chamber vapor 455. In some embodiments, cooler and higher alcohol composition enriched vapor is used to selectively extract specific aroma compounds from the grain. In some embodiments, vacuum distillation methods, as known in the art, are used to further reduce the temperature of the enriched alcoholic vapor. In some embodiments, hotter and lower alcohol composition vapor is used to selectively extract specific aroma compounds from the grain. In some embodiments, the heating rate is fixed and only the cooling rate is modulated. In some embodiments, the cooling rate is fixed and only the heating rate is modulated. In some embodiments, the temperature of the enriched vapor is deliberately kept below the gel point of the starch in the grain. In some embodiments, the communications to and from the controller are wireless. In some embodiments, the communications to and from the controller are hardwired.

A flow chart of the fourth embodiment is shown in FIG. 4C, with process 480 having a series of steps. Alcoholic solution 481 is heated, resulting in the production of alcoholic vapor. Controlled reflux 482 is induced, resulting in the production of compositionally controlled alcoholic vapor 483. Compositionally controlled alcoholic vapor 483 is then passed through, and interacts with, grain 484, resulting in the production of grain aromatized alcoholic vapor 485 and selectively heated grain 488. Grain aromatized alcoholic vapor 485 is then condensed to condensed vapor 486, and condensed vapor 486 is collected as aromatized distillate 487. In some embodiments, the composition and temperature of the vapor is optimized to selectively increase the extraction of specific aromas. In some embodiments, the composition and temperature of the vapor is optimized to selectively decrease the extraction of specific aromas. In some embodiments, the composition and temperature of the vapor is optimized to selectively heat the grain so as to minimize cooking of the grain, including but not limited to reducing starch gelling. In some embodiments, the alcoholic solution is the undistilled product of a fermentation, having an approximate % alcohol by volume between 4% and 25%. In some embodiments, the alcoholic solution is the result of a single distillation of a fermentation (so-called "low wines"). In some embodiments, the alcoholic solution is the result of more than one distillation of a fermentation. In some embodiments, the alcoholic solution is diluted with additional water. In some embodiments, salts or other solutes such as pH altering compounds (e.g., acids, bases, buffers) are added to the alcoholic solution prior to heating. In some embodiments, emulsifiers or surfactants are added to the alcoholic solution prior to heating. In some embodiments, the alcohol in the alcoholic solution was produced from the fermentation of the same grain that is later heated with the alcoholic solution. In some embodiments, the grain used in this process is subsequently fermented. In some embodiments, the grain used in this process is subsequently fermented and combined with the aromatized distillate. In some embodiments, the alcohol in the alcoholic solution was produced from the fermentation of a carbohydrate source other than the grain used that is later heated with the alcoholic solution.

As an additional example of the fourth embodiment, consider a distiller who is producing grain spirit while using the apparatus and process of the fourth embodiment. Through use of the apparatus and process of the fourth embodiment, this distiller can selectably extract and capture aromas released from grain, based on vapor temperature and ethanol composition, and this distiller can add those selected aromas back to distilled spirit product, allowing for a more robust flavor/aroma in the distilled spirits product. This is of particular advantage when considering high purity distilled spirits, such as those distilled to very high proof, which retain little flavor from the original grain or mash, allowing a distiller to produce cleaner spirits (in terms of undesirable fermentation by-products, which may result in off flavors or hangover) that still possess select desirable aromas of the grain/mash used.

As an additional example of the fourth embodiment, consider a distiller who is producing grain spirit while using the apparatus and process of the fourth embodiment. Through use of the apparatus and process of the fourth embodiment, this distiller can extract aromas from grain, while maintaining a vapor temperature low enough as to not gel the starch or cook other components in the grain, allowing the grain to maintain a structure that allows for better vapor passage, and preventing clogging of the vapor extraction system.

The first four embodiments of this invention make use of "batch" distillation processes and apparatuses, in which the heating vessel is filled with liquid that is then heated until a certain amount of that liquid is vaporized and a certain amount of distillate is collected. Many larger commercial beverage distilleries make use of "continuous" distillation processes and apparatuses. Many such continuous distillation devices and methods are known in the art of beverage distillation as well as petrochemical distillation. Simplistically, continuous alcohol stills function by feeding alcoholic solution into a reflux column, then applying heat (typically as steam) to the bottom of the column, and then heat from the steam is passed to alcoholic solution along the interaction surfaces of the column, resulting in decreasing concentrations of alcohol in the liquid phase as liquid falls down the column, and increasing concentrations of alcohol in the vapor phase as vapor moves up the column. The resulting dynamic equilibrium and gradient of alcohol (and water) concentrations will also result in a gradient of temperatures over the column, with the top being hottest and the bottom being coolest. Typically such continuous columns will have various take off ports over the length of the column, including one for relatively clean alcohol in the hearts port, typically in the upper but not uppermost part of the column, as well as one (or more) for heads/fores at the coolest/uppermost part of the column, and one (or more) for the tails/stripped waste at the bottom/hottest portion of the column. The alcohol solution fed into such a column is often fermented material (e.g., corn mash, wine). In many cases multiple continuous distillation columns are linked in a process, allowing for higher purity that would be achievable in a single column. A major flaw in continuous stills is that the low boiling point heads/fores are always passing by the hearts take off port, and so the hearts are always going to be slightly contaminated by heads/fores, unlike in a batch reflux process where low boiling materials can be easily removed prior to hearts collection. Regardless, various continuous processes and apparatuses are adaptable to the grain aromatization process of this invention.

Figure 5A:
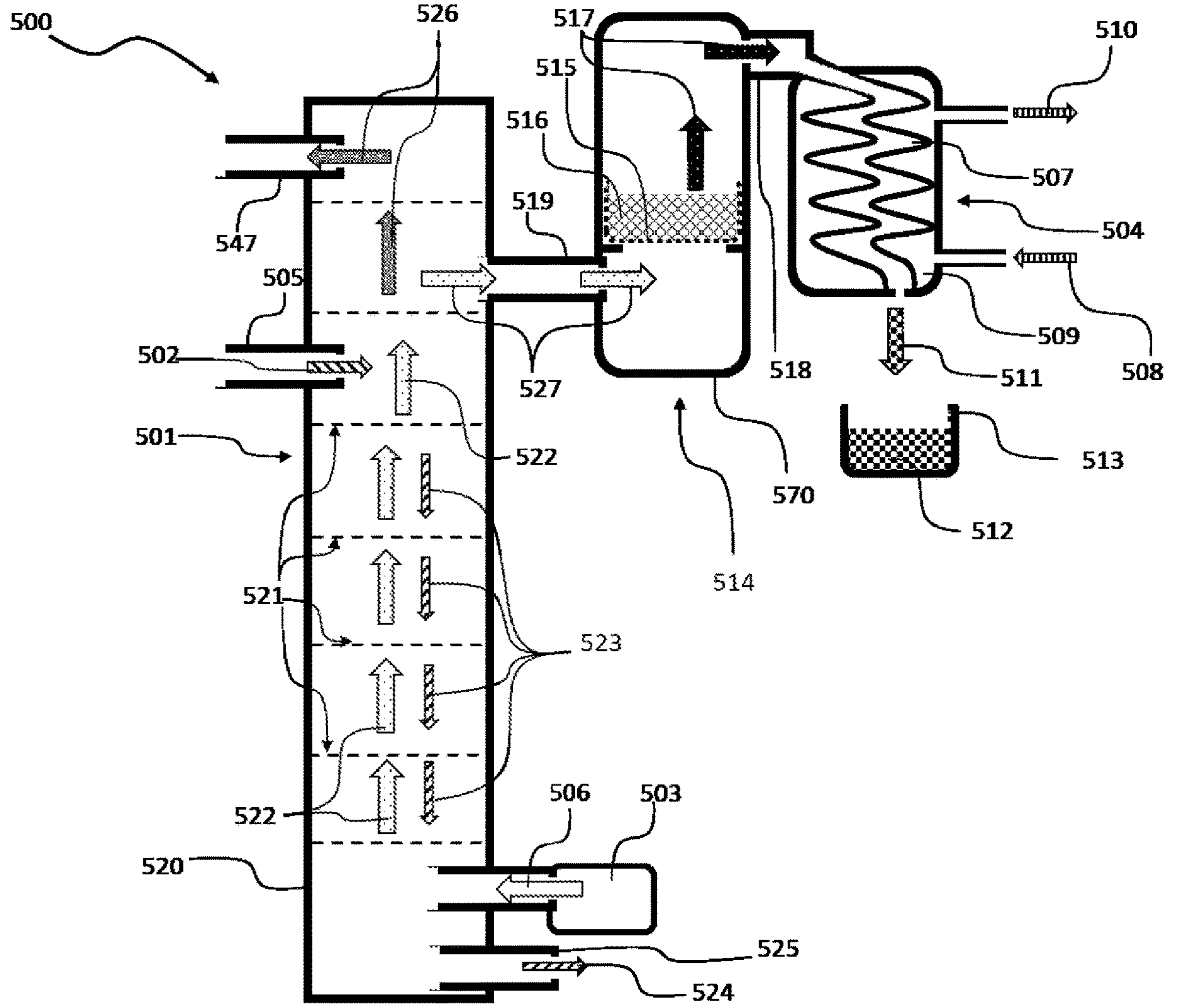
FIG. 5A is a drawing showing a sectional view of the device and method of the fifth embodiment of this invention.
Figure 5B:
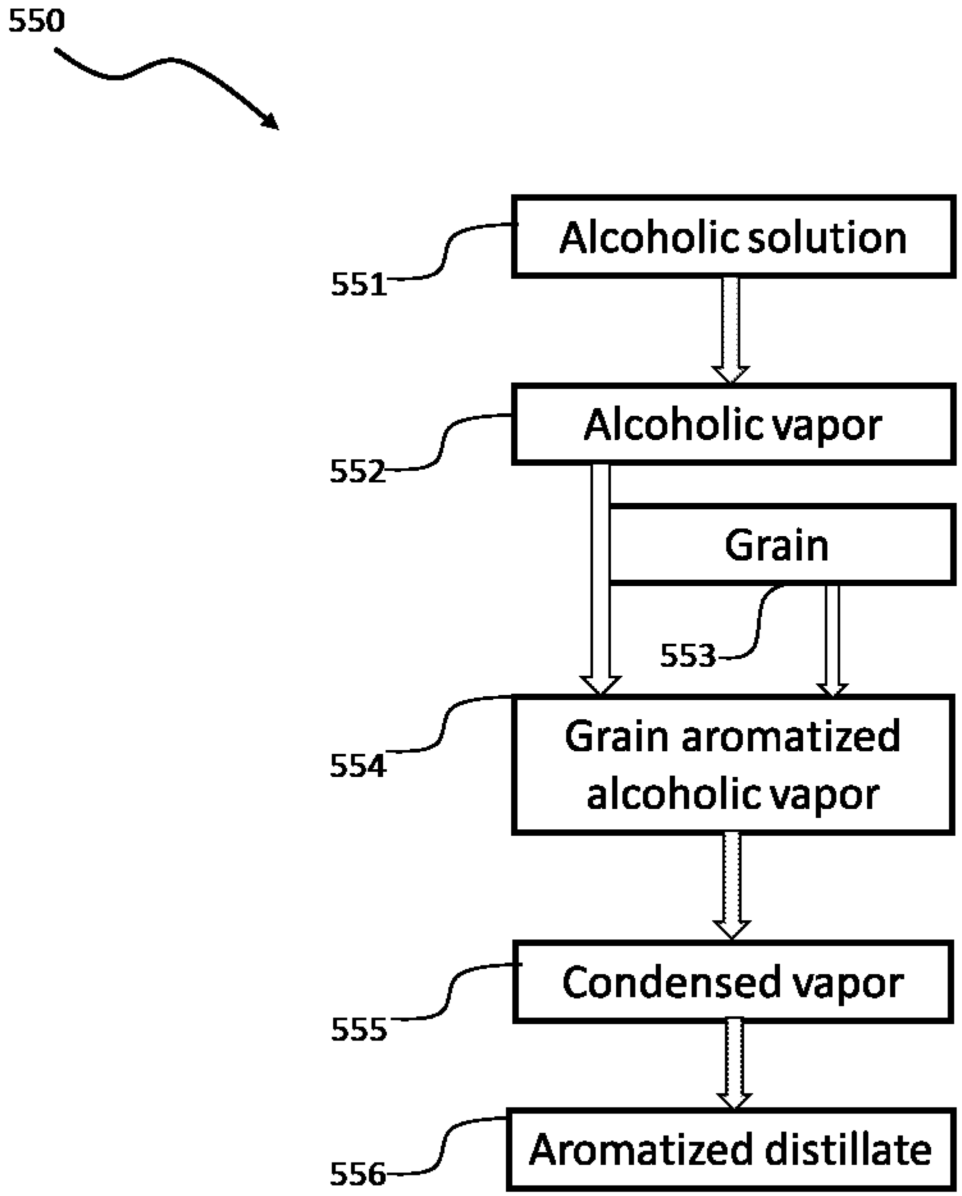
FIG. 5B is a flow chart showing the method of the fifth embodiment of this invention.

The fifth embodiment of this invention is shown in FIG. 5A and FIG. 5B. FIG. 5A shows the apparatus of the fifth embodiment, with apparatus 500 having continuous column 501, extraction chamber 514, and condenser 504, with condenser 504 being connected to extraction chamber 514 by transfer tube 518, and with extraction chamber 514 being connected to continuous column 501 by hearts takeoff port 519. Continuous column 501 has exchange surfaces 521, column structure 520, alcohol solution inlet 505, steam source 503, steam inlet 506, hearts takeoff port 519, heads/fores takeoff port 547, and tails/waste takeoff port 525. Condenser 504 has internal structure 507 and cooling jacket 509. Extraction chamber 514 has enclosure 570 and vapor permeable container 515. Grain 516 is placed in vapor permeable container 515 of extraction chamber 514. Liquid alcoholic solution 502 is introduced into continuous column 501 through alcohol solution inlet 505, while steam source 503 is introduced into continuous column 501 through steam inlet 506. As liquid alcoholic solution 502 falls through continuous column 501 over exchange surfaces 521, stripped alcoholic solution 523 interacts with rising enriched vapor 522 from steam 506, until waste liquid 524 is removed at tails/waste takeoff port 525, while heads/fores 526 are removed at heads/fores takeoff port 547, and hearts vapor 527 is transferred to extraction chamber 514 through hearts takeoff port 519. Hearts vapor 527 then passes through vapor permeable container 515 and grain 516, resulting in the heating of grain 516 and the production of aromatized vapor 517, with aromatized vapor 517 passing through transfer tube 518 into internal structure 507 of condenser 504, whereupon heat is exchanged from aromatized vapor 517 to cooling jacket 509, with cooling input flow 508 reducing the temperature of cooling jacket 509, and with heat being carried off by cooling output flow 510. As heat is lost from aromatized vapor 517 within condenser 504, aromatized vapor 517 goes from the gas phase to the liquid phase, resulting in condensate 511, with condensate 511 being collected in receptacle 513 as aromatized distillate 512. In some embodiments, there is more than one column and/or heat source. In some embodiments, there is no heads/fores takeoff port, and all pass-through vapor is collected in the hearts takeoff port. In some embodiments, the continuous column inlets and outlets are monitored by a plurality of sensors. In some embodiments, the continuous column inlets and outlets are controlled by a plurality of valves, including electronically or microprocessor-controlled valves. In some embodiments, the alcoholic solution is preheated prior to introduction into the continuous column. In some embodiments, the condenser is a shotgun condenser, a finned air condenser, or other condensers known in the art. In some embodiments, the vessel, column, extraction chamber, transfer tube, and/or condenser are held at vacuum. In some embodiments, the vessel, column, extraction chamber, transfer tube, and/or condenser are pressurized. In some embodiments, the exchange surface is one or more plate(s) or tray(s) in the continuous column, including perforated plates, bubble cap plates, valved plates, or other vapor-liquid interaction surfaces known in the art. In some embodiments, the riser contains "column packing" material, including copper mesh, Raschig rings, or other column packing material known in the art. In some embodiments, the reflux column does not contain plates or column packing material.

A flow chart of the fifth embodiment is shown in FIG. 5B, with process 550 having a series of steps. Alcoholic solution 551 is introduced into the continuous column whereupon it is heated through exchange with vapor as it falls along the column, resulting in the production of alcoholic vapor 552. Alcoholic vapor 552 is then extracted from the column whereupon it is passed through, and interacts with, grain 553, resulting in the production of grain aromatized alcoholic vapor 554. Grain aromatized alcoholic vapor 554 is then condensed to condensed vapor 555, and condensed vapor 555 is collected as aromatized distillate 556. In some embodiments, the alcoholic solution is the undistilled product of a fermentation, having an approximate % alcohol by volume between 4% and 25%. In some embodiments, the alcoholic solution is the result of a single distillation of a fermentation (so-called "low wines"). In some embodiments, the alcoholic solution is the result of more than one distillation of a fermentation. In some embodiments, the alcoholic solution is diluted with additional water. In some embodiments, salts or other solutes such as pH altering compounds (e.g., acids, bases, buffers) are added to the alcoholic solution prior to heating. In some embodiments, emulsifiers or surfactants are added to the alcoholic solution prior to heating. In some embodiments, the alcohol in the alcoholic solution is produced from the fermentation of the same grain that is later heated with the alcoholic solution. In some embodiments, the alcohol in the alcoholic solution is produced from the fermentation of a carbohydrate source other than the grain used that is later heated with the alcoholic solution. In some embodiments, the grain used in this process is subsequently fermented. In some embodiments, the grain used in this process is subsequently fermented and combined with the aromatized distillate.

As an example of the fifth embodiment consider a distiller who is producing grain spirit while using the apparatus and process of the fifth embodiment. Through use of the apparatus and process of the fifth embodiment, this distiller can capture aromas released from the cooking and mashing of highly aromatic grains, and then this distiller can add these aromas to spirit produced, in part or in full, from the fermentation and distillation of another grain or sugar source, allowing for the production of a highly aromatic and/or flavorful distilled spirit product. This is of particular advantage in cases where the highly aromatic grain is expensive or challenging to mash and/or ferment, while the bulk of the spirit is produced from inexpensive or easy-to-work-with grain or sugar sources, thus allowing for the production of a robustly flavored and/or aromatic distilled spirits product using less of the highly aromatic grain than would be required if the aromatic grain was the sole or primary source of alcohol.

In some embodiments, elements from the various embodiments are combined, in whole or in part.

In some embodiments, vapor-exposed surfaces in one or more parts of the apparatus are made from, or plated with, copper or other catalytic or adsorptive material. In some embodiments, additional reactive or adsorptive material is packed or otherwise placed within the vapor-exposed surfaces of the apparatus.

In some embodiments, aromatized spirits are redistilled after a period of rest of one day or more. In some embodiments, oxygen or other gas is introduced into the aromatized spirit prior to redistillation. In some embodiments, the aromatized spirits are redistilled in a copper or copper containing distillation device.

In some embodiments, the fermentation and mashing steps are partially or fully combined, such as in a koji or microbial co-culture process as utilized in sake or shochu production, in which grain is cooked and then inoculated with a microbial co-culture that breaks down the starch into fermentable sugars concurrent with the fermentation of those sugars to alcohol. Such a process includes but is not limited to a co-culture of *Aspergillus* species and yeast.

In some embodiments, fruits or other fermentable plant-based or other biological material are used in place of grain to aromatize spirits, including spirits produced from the fermentation of these fruits or other fermentable plant-based or other biological materials.

The invention claimed is:

1. A method for the capture of volatile compounds released from grain, comprising:

placing an alcohol-water solution in a vessel, with this vessel being connected to a reflux column and reflux condenser, with this reflux column and reflux condenser affixed between the vessel and a grain supporting chamber;

placing and supporting unfermented grain in the grain supporting chamber affixed to the reflux column and reflux condenser;

heating the vessel and alcohol-water solution causing the formation of a vapor that passes from the vessel into the reflux column and reflux condenser, and with the reflux column and reflux condenser being configured such that the temperature and composition of the alcohol-water vapor can be controlled resulting in a lower vapor temperature or higher percentage alcohol-to-water ratio vapor prior to vapor interaction with the unfermented grain, and with this vapor then passing into the grain in the grain supporting chamber, allowing for controlled extraction of volatile compounds from unfermented grain;

extracting volatile compounds from unfermented grain into the vapor to obtain extracted and vaporized volatile unfermented grain compounds, capturing and condensing the extracted and vaporized volatile unfermented grain compounds to obtain an extract condensate; and adding the extract condensate to an alcoholic beverage to increase the flavor of the alcoholic beverages.

2. A method for the capture of volatile compounds released from grain, comprising:

placing an alcohol-water solution in a vessel, with this vessel being connected to a continuous distillation column, with this continuous distillation column affixed between the vessel and a grain supporting chamber, placing and supporting unfermented grain in the grain supporting chamber affixed to the continuous distillation column;

heating the alcohol-water solution in the vessel and continuous distillation column causing the formation of a vapor that passes through the continuous distillation column, and with the continuous distillation column being configured such that the temperature and water-to-alcohol ratio of the alcohol-water vapor can be reduced resulting in a lower vapor temperature or higher percentage alcohol-to-water ratio vapor prior to vapor interaction with the unfermented grain, and with this vapor then passing into the grain in the grain supporting chamber, allowing for selected extraction of volatile compounds from unfermented grain;

extracting volatile compounds from unfermented grain into the vapor to obtain extracted and vaporized volatile unfermented grain compounds, capturing and condensing the extracted and vaporized volatile unfermented grain compounds to obtain an extract condensate;

and adding the extract condensate to an alcoholic beverage to increase the flavor of an alcoholic beverage.

* * * * *